(12) United States Patent
Vaghasiya et al.

(10) Patent No.: US 11,721,513 B2
(45) Date of Patent: Aug. 8, 2023

(54) REMOTE LOAD SWITCHING CIRCUIT BREAKER

(71) Applicant: EATON INTELLIGENT POWER LIMITED, Dublin (IE)

(72) Inventors: Kamal Madhubhai Vaghasiya, Mangalore (IN); Sandy Jimenez Gonzalez, Coraopolis, PA (US); Karthik Satyanarayanan, Pune (IN); Shashank Kadam, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 231 days.

(21) Appl. No.: 17/225,564

(22) Filed: Apr. 8, 2021

(65) Prior Publication Data

US 2022/0328273 A1 Oct. 13, 2022

(51) Int. Cl.
*H01H 89/08* (2006.01)
*H02J 13/00* (2006.01)
*H01H 83/20* (2006.01)
*H01H 71/66* (2006.01)

(52) U.S. Cl.
CPC ............ *H01H 89/08* (2013.01); *H01H 83/20* (2013.01); *H02J 13/0004* (2020.01); *H01H 2071/665* (2013.01); *H01H 2083/203* (2013.01)

(58) Field of Classification Search
CPC .. H01H 71/04; H01H 71/123; G01R 31/3272; G01R 31/3274; G01R 19/2513; H02H 7/262; H02H 7/22; H02H 1/0015; H02H 1/04; H02H 1/06; H02H 1/063; H02H 1/0061; H02H 3/335; H02H 3/044; H02H 3/04
See application file for complete search history.

(56) References Cited

U.S. PATENT DOCUMENTS

2018/0007739 A1* 1/2018 Knappenberger ... H02H 1/0007
2018/0059175 A1* 3/2018 Hase ...................... G01R 31/52

* cited by examiner

*Primary Examiner* — Bryan R Perez
(74) *Attorney, Agent, or Firm* — Eckert Seamans Cherin & Mellott, LLC

(57) ABSTRACT

A remote load switching circuit breaker includes a primary contact; a secondary contact in series with the primary contact and coupled to a secondary contact driving circuit, where the secondary contact is switched on and off remotely by a user using a user device communicatively coupled to the remote load switching circuit breaker via wireless communications technologies; a shunt element structured to measure a shunt voltage drop and to tap power from a line side of the primary contact; a control circuit comprising a controller and a communication module, the controller including a firmware; and a power supply and sensing circuit structured to supply power to the control circuit and to sense various voltages, where the secondary contact is fully powered by the power supply and sensing circuit.

23 Claims, 18 Drawing Sheets

REMOTE LOAD SWITCHING CIRCUIT BREAKER

BACKGROUND OF THE INVENTION

Field of the Invention

The disclosed concept relates generally to circuit breakers for use with a load, and in particular, to remote load switching circuit breakers using a secondary contact via wireless communication.

Background Information

Remote switching of a circuit breaker is currently achieved by using an external wired communication link. Some remote switching circuit breaker may turn OFF only, but may not turn ON remotely. Some remote switching breakers may remotely turn ON and OFF by requiring installing an extra pole in a load center. Further, the switching circuit for the circuit breaker is powered by an external AC/DC power source. As such, in order to remotely switch the circuit breaker, additional wiring and components (a converter, a battery, etc.) must be added to the circuit breaker system. Also, the reliance on the external power makes the conventional remote switching circuit breakers dependent on other circuitry (e.g., additional controller, sensor, driving circuits for the switching circuit). Moreover, the currently available remote switching circuit breakers do not offer power quality checks, e.g., upon resumption of power after a power outage. Such lack of power quality check may lead to damages to the loads or other hazards to the circuit breaker system. For example, the power quality upon resuming power after a power outage is generally poor (e.g., voltage is not sinusoidal, frequency is not 60 Hz, etc.). Without the power quality check, the user will not have the assurance that the power quality is back to normal after resumption and may be exposed to possibly damaging the loads or other hazard. In addition, in cases of fault or an overload conditions, the conventional remote switching circuit breakers are tripped automatically, and thus require the user to manually clear the fault or overload conditions and reset the circuit breaker, thereby reducing the convenience and the flexibility intended to be offered to the user of 'remote' switching.

There is room for improvement in remote switching circuit breakers.

SUMMARY OF THE INVENTION

These needs, and others, are met by at least one embodiment of the disclosed concept in which a remote load switching circuit breaker includes a primary contact coupled to a primary contact trip mechanism and structured to trip the remote load switching circuit breaker upon detecting a fault condition by a sensor; a secondary contact in series with the primary contact and coupled to a secondary contact driving circuit, wherein the secondary contact is switched on and off remotely by a user using a user device communicatively coupled to the remote load switching circuit breaker via wireless communication; a shunt element coupled to the primary contact and structured to measure a line current; a control circuit comprising a controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker self-test based at least in part on the user command; and a power supply and sensing circuit structured to supply power to the control circuit, the secondary contact, the secondary contact driving circuit, and the primary contact trip mechanism, and to sense voltages at a plurality of points in the circuit breaker and transmit the sensed voltage to the controller for determining respective current based on the sensed voltages, wherein the secondary contact is fully powered by the power supply and sensing circuit, without having to receive power from an external power supply.

In accordance with an example embodiment of the disclosed concept, a remote load switching circuit breaker system includes a load; a hot conductor electrically coupled to a power source; a load conductor electrically coupled to the load; a user device; a remote load switching circuit breaker electrically coupled to the hot conductor and the load conductor, the remote load switching circuit breaker including: a primary contact coupled to the a primary contact trip mechanism and structured to trip the circuit breaker upon detecting a fault condition by a sensor; a secondary contact in series with the primary contact and coupled to a secondary contact driving circuit, wherein the secondary contact is switched on and off remotely by a user using the user device communicatively coupled to the remote load switching circuit breaker via wireless communications technologies; a shunt element coupled to the primary contact and structured to measure a line current; a control circuit comprising a controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker self-test based at least in part on the user command; and a power supply and sensing circuit structured to supply power to the control circuit, the secondary contact, the secondary contact driving circuit, and the primary contact trip mechanism, and to sense voltages at a plurality of points in the circuit breaker and transmit the sensed voltage to the controller for determining respective current based on the sensed voltages, where the secondary contact is fully powered by the power supply and sensing circuit, without having to receive power from an external power supply.

In accordance with an example embodiment of the disclosed concept, a method for operating a remote load switching circuit breaker after a pre-checking power quality of a circuit breaker includes: performing a breaker line parameters test for a predefined period, the breaker line parameters test comprising testing a circuity including breaker electronics and operations of the breaker electronics; determining whether the remote load switching circuit breaker has passed the breaker line parameters test; performing a power quality test including testing for voltage signal, frequency and zero cross detection; determining whether the remote load switching circuit breaker has passed the power quality check; and turning on the remote load switching circuit breaker only after passing the breaker line parameters test and the power quality test.

In accordance with an example embodiment of the disclosed concept, a method operating a remote load switching circuit breaker upon a detection of a fault includes: opening a secondary contact of the remote load switching circuit breaker without closing a primary contact and transmitting a message to a user alerting the detected fault; attempting to clear the fault by opening and closing the secondary contact; determining whether the fault is still present in the remote load switching circuit breaker; and operating the remote load switching circuit breaker if the fault is not present; or repeating the attempts to clear the fault by opening and closing the secondary contact for a predefined number of times, determining that the fault is a permanent fault to be cleared physically by a user upon detecting the fault after attempting to clear for the predefined number of times, opening the primary contact and notifying a user of the permanent default.

In accordance with an example embodiment of the disclosed concept, a method for checking a status of a remote load switching circuit breaker includes: determining whether a user requesting to open a secondary contact of the remote load switching circuit breaker using a user device via wireless communications technologies; based upon a determination that the user is requesting to open the secondary contact, determining whether a line current is above a breaking capacity of a power relay for the secondary contact; and opening the secondary contact, notifying the user of the opening, and waiting for a close command from the user if the line current is not above the breaking capacity of the power relay; determining whether the line current is above the breaking capacity of the power relay, and notifying the user that the secondary contact is not able to be opened if the line current is above the breaking capacity of the power relay, or opening the secondary contact and notifying the user of the opening if the line current is not above the breaking capacity of the power and waiting for a close command from the user.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
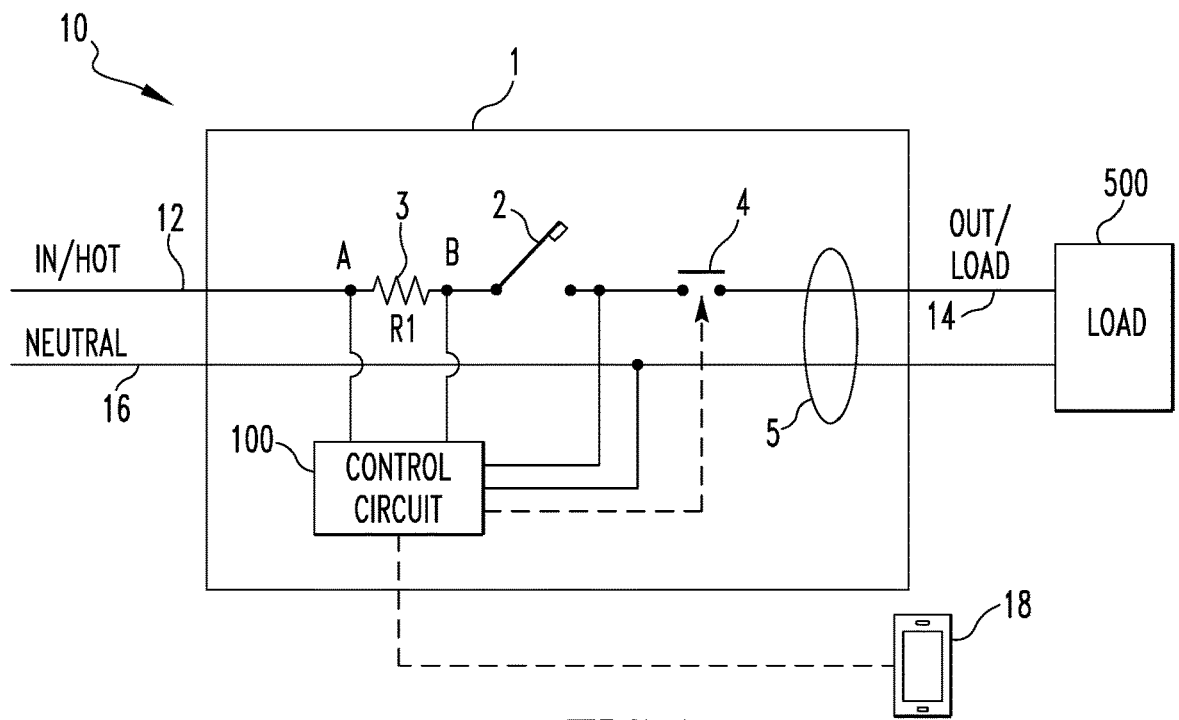
FIG. 1 is a schematic diagram of a remote load switching circuit breaker system in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the term "number" shall mean one or an integer greater than one (i.e., a plurality).

Conventional remote switching circuit breakers use an external wired communication for remote switching of the circuit breakers, requiring a user to be at user devices connected to the circuit breaker in order to remotely switch the circuit breaker. Further, the remote switching of the circuit breaker is powered by an external AC/DC power source (e.g., an external converter, a battery, etc.), which requires additional wiring and components added to the circuit breaker system. Such reliance on the external power makes the conventional remote switching circuit breakers dependent on other circuitry as well (e.g., a controller, a driving circuit for the switching elements, etc.). Moreover, the remote switching circuit breakers do not offer power quality checks, e.g., upon resumption of power after power outage. Upon resumption of power after a power outage, the quality of power may be poor, e.g., voltage is not sinusoidal, frequency is not 60 Hz, etc., which could damage the loads or lead to unwanted hazardous conditions. As such, without the power quality check, the circuit breakers automatically turn on upon the resumption of the power, thereby possibly damaging the loads. Additionally, the conventional circuit breakers are tripped upon detecting of every fault or overload condition. Thus, even a nuisance (e.g., a one-time occurring event that can be handled by the circuit breakers) would trigger tripping of the circuit breakers, requiring the user to subsequently return to the circuit breakers, manually clear the fault conditions and reset the circuit breaker. As such, while the remote switching circuit breakers may be switched remotely, they face geographic restrictions due to having to use wired connections only, encounter damages due to poor power quality due to automatic turn ON upon resumption of power after a power outage, or automatically tripping upon detection of a fault or overload condition, thereby reducing the flexibility and convenience associated with 'remote, switching.

Figure 4:
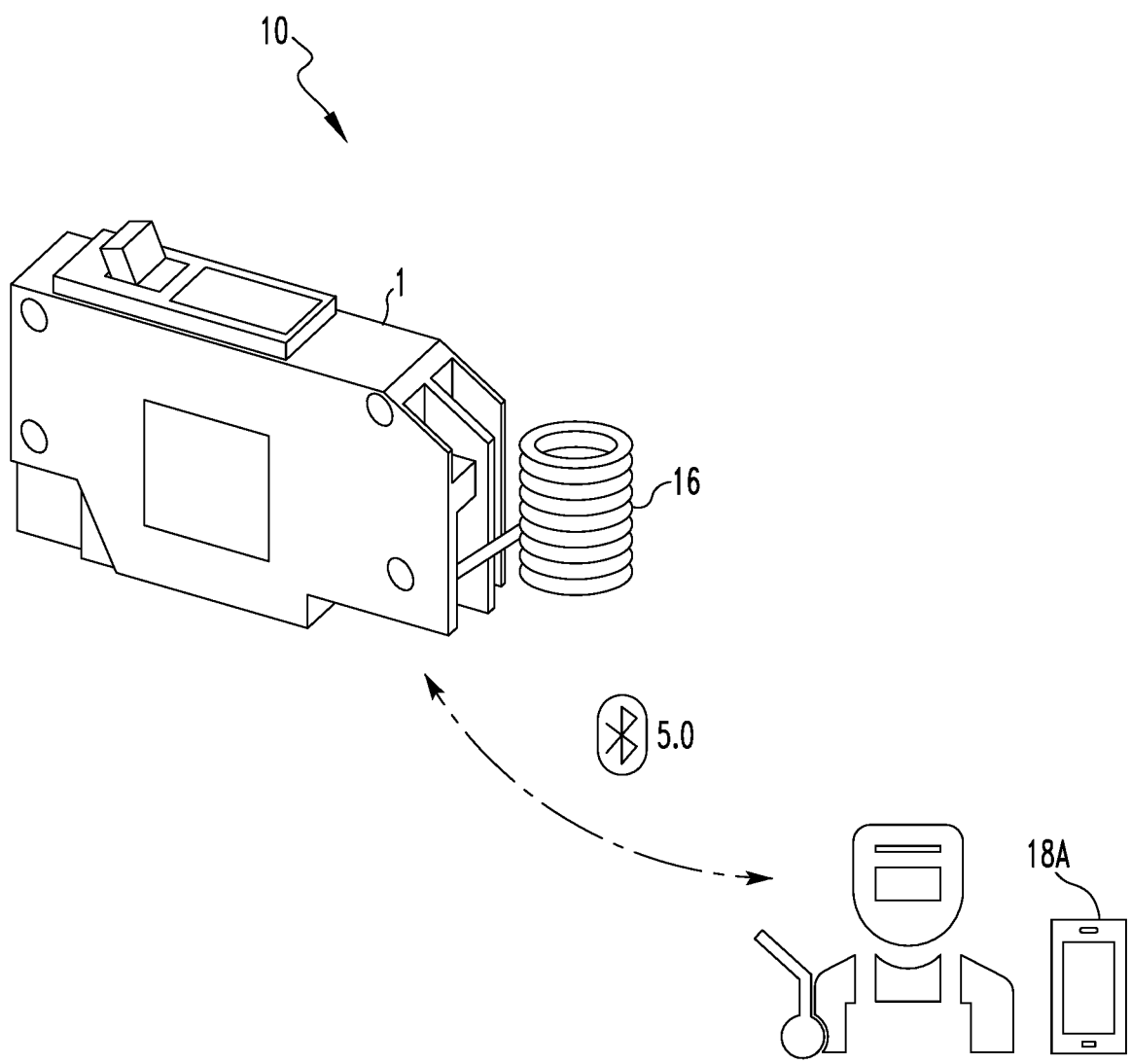
FIG. 4 is a diagram of a remote load switching circuit breaker system in accordance with an example embodiment of the disclosed concept.
Figure 5:
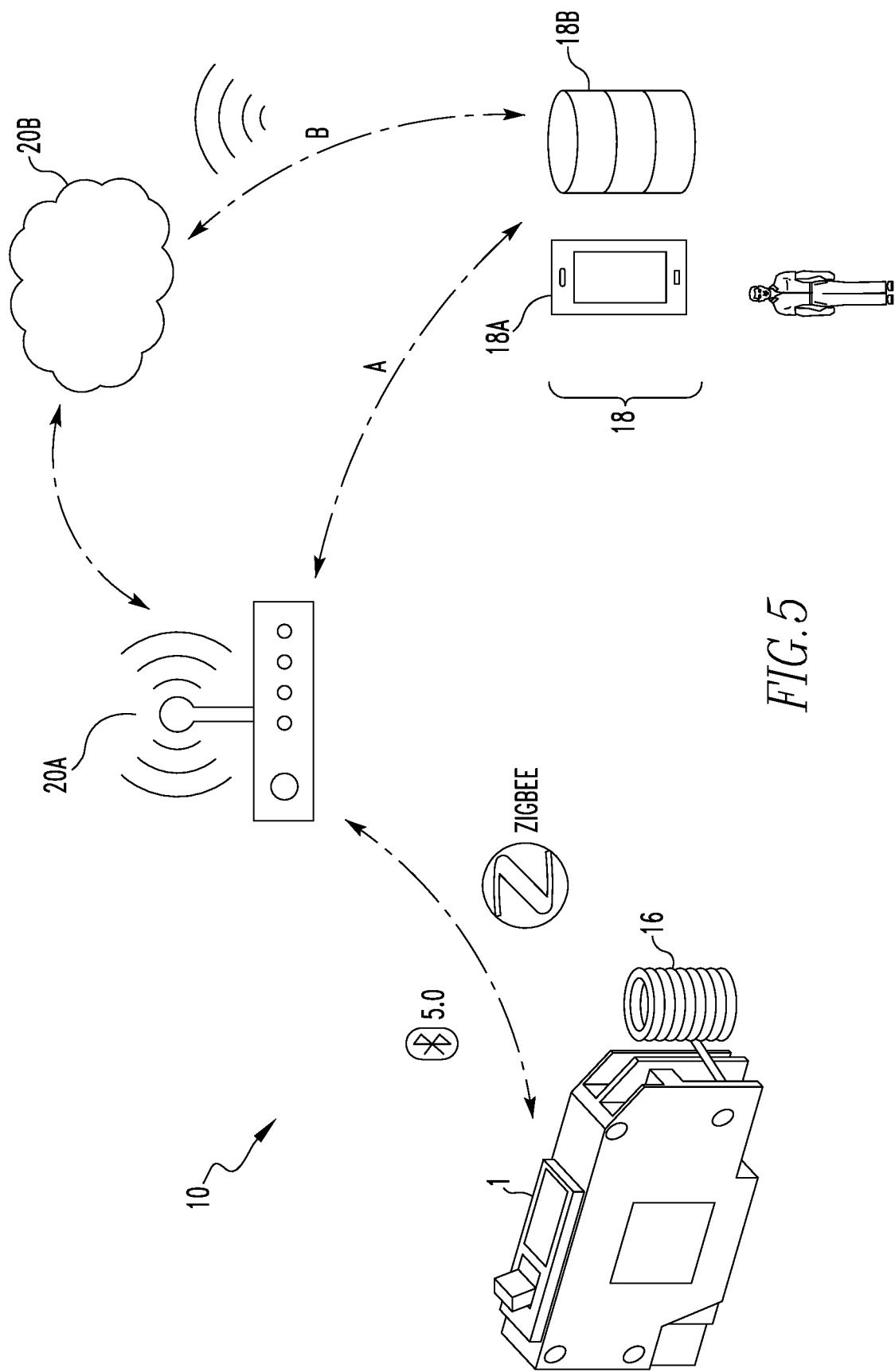
FIG. 5 is a diagram of a remote load switching circuit breaker system in accordance with an example embodiment of the disclosed concept.

Example embodiments of the disclosed concept address these issues. For example, the present disclosure provides remote switching of the remote load switching circuit breaker using a secondary contact via wireless communication. For example, the remote load switching circuit breaker may be communicatively coupled to a user device using short range or long range wireless communication, thereby allowing a user to remotely switch on and off loads wherever he/she is. In some example embodiments, short range wireless communication (as shown in FIG. 4) may include Bluetooth™ low energy (BLE), ZigBee, or WiFi, and allows a gateway edge user devices (e.g., a cellular phone, an access point device, a tablet, a desktop, etc.) to communicate with a communication module within the remote load switching circuit breaker for, e.g., remotely switching of a secondary contact to a load. In some example embodiments, long range wireless communication (as shown in FIG. 5) may include LTE, LTE-A, LTE-A Pro, etc. Further, by allowing access point communications using gateway and edge user devices, the remote load switching circuit breakers enable communications without Internet. In other words, it is possible for the user to remotely monitor the status of the remote load switching circuit breaker and its logs (stored in a memory) through edge user devices. The remote load switching circuit breaker may be connected to Web through a server, making it possible to virtually control and/or monitor the remote load switching circuit breaker from anywhere anytime. With the remote load switching circuit breaker, it is possible to schedule the on and off of a particular load or branch. The user is alerted on his/her edge devices (e.g., cellular phones) when the remote load switching circuit breaker trips with a type of condition that caused the tripping of the circuit breaker. As stated previously, the remote load switching circuit breaker may be controlled via a Bluetooth connection, making it easy for an installer to check functionality without an Internet presence. The remote load switching circuit breaker may also be controlled via an access point connectivity where there is no Internet connection.

In addition, the present disclosure provides the switching circuit to be powered internally 100% by the electronics within the remote load switching circuit breakers, thereby dispensing with any need to add or rely on an external power supply to the switching circuit. For example, the secondary contact of the remote load switching circuit breaker in accordance with the present disclosure is powered by the power supply and/or any electronics within the remote load switching circuit breaker. That is, a power supply circuit within the remote load switching circuit breaker which receives the AC power source which becomes converted into DC power to activate a controller and other electronics within the circuit breaker provides sufficient power to open and close the secondary contact. In addition, any DC voltages (except for the DC line voltage) within the remote load switching circuit breaker may supply power to the secondary contact to switch on and off as necessary. For example, a storage capacitor in the secondary contact itself may provide power to switch on and off the secondary contact.

Further, the remote load switching circuit breaker in accordance with the present disclosure performs pre-checking of power quality for normal times or upon power resumption after a power outage to ensure that the remote load switching circuit breaker operates only when the power quality meets the prerequisites (e.g., voltage is sinusoidal, frequency is 60 Hz, voltage and/or current is at the rated value, etc.). The pre-checking of power quality is also referred to herein as 'Shake down.' Shakedown in a normal operation is described in detail with reference to FIG. 11. Shakedown upon power resumption after a power outage is described in detail with reference to FIG. 12. Also, the present disclosure enables resolving less severe fault conditions or overload conditions by the circuit breakers without requiring the user to physically return to the remote load switching circuit breakers, clear the fault or overload, and manually reset the remote load switching circuit breakers. Resolving the less severe fault conditions is described in detail with reference to FIG. 14, and clearing the manageable overload conditions is described in detail with reference to FIG. 15.

Thus, the remote load switching circuit breaker in accordance with the present disclosure is advantageous over the conventional remote switching circuit breakers in that: (1) it offers the user a remote, wireless switching capability of the loads via a user device wherever he/she is, thereby providing a meaningful flexibility, convenience and freedom to the user; (2) it eliminates reliance on external power supplies by enabling 100% internal power supply of the switching on and off of the secondary contact; (3) it prevents any damages to the load or potential hazards by pre-checking the power quality within the remote load switching circuit breaker during regular operation and/or upon power resumption after a power outage; and (4) it eliminates unnecessary user visits to the remote load switching circuit breaker by allowing the circuit breakers and/or users to resolve less severe faults or overloads by remotely opening and closing the secondary contact without automatically opening the primary contact upon detecting of any fault or overload conditions.

FIG. 1 is a schematic diagram of a remote load switching circuit breaker system 10 in accordance with an example embodiment of the disclosed concept. The remote load switching circuit breaker system 10 includes a HOT (LINE/IN) conductor 12, a LOAD (OUT) conductor 14, and a NEUTRAL conductor 16. The HOT conductor 12 may be electrically connected to a power source (not shown) such as 120 Vac residential power or another suitable power source. The AC power source may be coupled to a power supply and sensing circuit (e.g., a power supply and sensing circuit 200 as described with reference to FIG. 2) within the remote load switching circuit breaker 1. The LOAD conductor 14 may be electrically connected to a load 500, e.g., a light, a refrigerator, A/C, etc. The remote load switching circuit breaker 1 may be directly connected to the NEUTRAL conductor 16 as shown in FIG. 1. The NEUTRAL conductor 16 may be electrically coupled to the load 500 to complete the AC power circuit. The remote load switching circuit breaker 1 is structured to trip open or switch open to interrupt current flowing to the load 500 in the case of a fault (e.g., a short circuit fault, a parallel arc fault, a permanent ground fault, etc.) or severe overload condition to protect the load 500. The remote load switching circuit breaker 1 is also structured to communicatively couple to an edge device 18, e.g., a cellular phone or gateway edge devices, held by a user for remotely controlling switching on/off of the load 500 wirelessly by using the secondary contact 4.

The remote load switching circuit breaker 1 includes a primary contact 2, a shunt element 3 (e.g., a resistor R1), a secondary contact 4, a current sensor 5, and a control circuit 100. The power comes 'In' to the line via the HOT conductor 12. The primary contacts 2 are structured to be in series with the secondary contact 4. The secondary contact 4 is electrically coupled to a current sensor 5, which is electrically coupled to the control circuit 100 and the load 500 via the LOAD (OUT) conductor 14. The load 500 is electrically coupled to the NEUTRAL conductor 16, thereby completing the AC loop.

Figure 2:
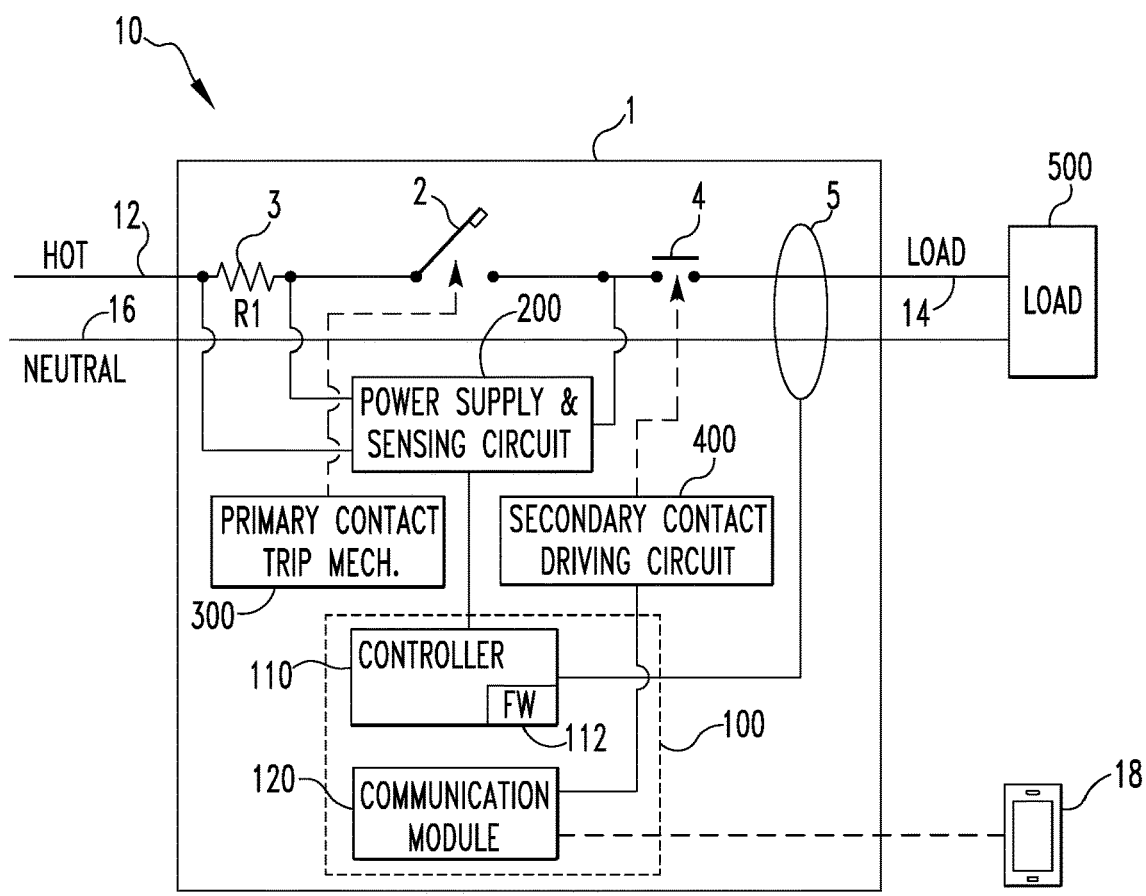
FIG. 2 is a schematic diagram of a remote load switching circuit breaker system shown in more detail in accordance with an example embodiment of the disclosed concept.

The primary contacts 2 may be a mechanical contact operable based on a signal from, e.g., the shunt element 3, the power supply and sensing circuit (as shown in FIG. 2), the control circuit 100, etc. The primary contacts 2 are tripped by a primary contact trip mechanism (e.g., a primary contact trip mechanism as shown in FIG. 2). The primary contacts 2 switch off when a fault (e.g., a short-circuit fault, severe overcurrent) or severe overload is detected. Conventional circuit breakers (i.e., thermal mag circuit breaker) may be a single contact, including mechanical contacts equivalent to the primary contacts 2 of the remote load switching circuit breaker 1.

The shunt element 3 may be a resistor R1 (e.g., a resistor having resistance of 10, 20, 30, etc., $\mu\Omega$) and is structured to measure the shunt voltage drop and transmits a signal including the measured line voltage to the control circuit 100, which in turn determines the line/hot current based on the measured line voltage. In this embodiment, the shunt element 3 is arranged between the HOT conductor and the primary contacts 2. Conventionally, the shunt element 3 are arranged after the primary contact 2. This conventional arrangement, however, leads to errors in detected line current since there is an impedance generated by a tip of the primary contacts 2. For example, the shunt resistance is supposed to be very precise, e.g., 0.03 m$\Omega$, 0.099 m$\Omega$, and thus, any additional impedance to the shunt resistance even if it is in $\mu\Omega$ may result in a huge difference in the current measurement. The conventional arrangement of the shunt element following the primary contacts 2 changes the shunt resistance by adding the impedance caused by the tip of the primary contacts and the voltage drop in the primary contacts 2. By placing the shunt element 3 between the HOT conductor 12 and the primary contacts 2, the shunt element 3 measures the voltage drop between A and B, and thus avoids any additional impedance and voltage drop of the primary contacts 2. Such measurement ensures the control circuit 100 to calculate the line current with accuracy.

The current sensor 5 may be a current transformer, a Hall-Effect sensor, etc. and is structured to sense the load current and arc/ground fault conditions. The shunt element 3, the current sensor 5, and other sensing circuit (that may be included in the power supply and sensing circuit 200 of FIG. 2) such as a sensor that detects whether the primary contacts 2 are open or not, a zero current detector (ZCD) for detecting voltage crossing at near zero as the sine signal repeatedly goes up to its peak current and down to zero current, a temperature sensing circuit for estimating bimetal strip temperature, etc., together may form a sensing network.

Figure 10:
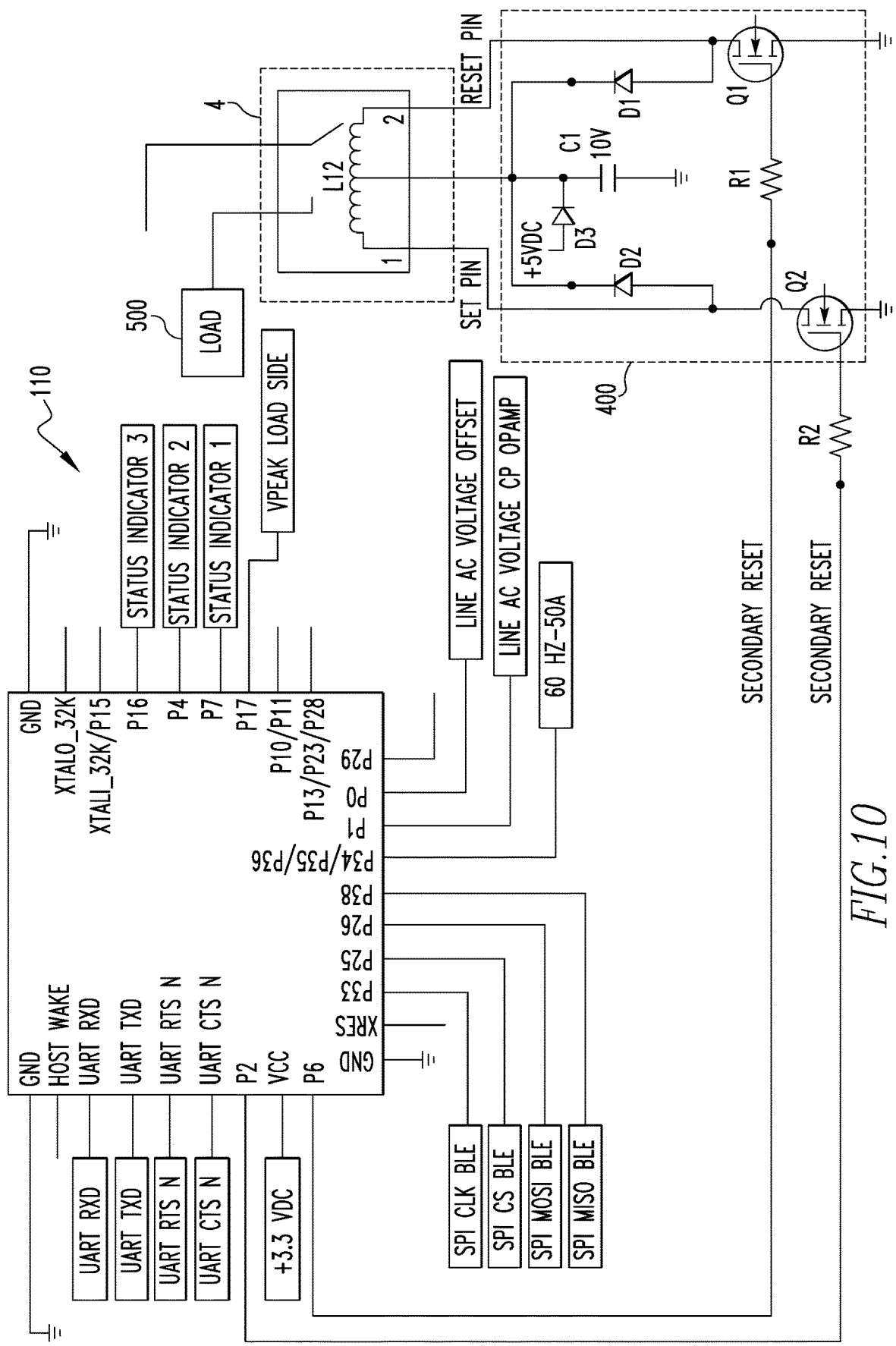
FIG. 10 is a schematic diagram of a secondary contact power relay and a controller of a remote load switching circuit breaker in accordance with an example embodiment of the disclosed concept.

The secondary contact(s) 4 is an electromechanical contact (e.g., a power relay) and structured to remotely switch on and/or off the load 500 by the user device 18 via wireless communication, e.g., Bluetooth™ low energy or WiFi for short distance, or LTE, LTE-A for long distance. The power relay may be a latching (bi-stable as shown in FIG. 10) or non-latching (monostable). The secondary contact 4 may also be a MEMS switch, thereby reducing the size of the remote load switching circuit breaker 1. Using a MEMS switch as the secondary contact 4 may reduce the length of the remote load switching circuit breaker 1. The secondary contact 4 may be powered fully by the power supply and sensing circuit and/or any electronics voltage within the circuit breaker 1, except for the line voltage, thereby eliminating the need to add or rely on external power supplies as the conventional remote switching circuit breakers do. Further, the secondary contact 4 is controllable by the user remotely and wirelessly via the user device 18. Such remote, wireless control of the secondary contact 4 by the user yields many benefits. For example, it allows the user to remotely switch on and off any load as the user desires at any time. Further, by allowing the circuit breaker 1 and the user to monitor the power quality during the normal operation or upon power resumption after a power outage, the secondary contact 4 enhances the safety of the remote load switching circuit breaker 1. That is, the secondary contact 4 opens when the power quality is poor and closes when the power quality becomes good, thereby preventing potential damages to the loads due to the poor power quality. For example, when the power quality is poor immediately upon power resumption after a power outage, the secondary contact 4 may be open upon power resumption and close when the power quality becomes good while maintaining the primary contacts 2 to be open. Moreover, the secondary contact 4 increases efficiency and provides much flexibility and convenience to the user by allowing the remote load switching circuit breaker 1 to resolve less severe faults or overload conditions by using the secondary contact 4 without automatically tripping the breaker 1 and requiring the user to physically eliminate the fault or overload conditions, manually reset the circuit breaker and turn on the circuit breaker.

The control circuit 100 may include a controller 110 and a communication module 120. The controller 110 may be a microprocessor, a microcontroller, or some other suitable processing device or circuitry. The communication module 120 may be a transceiver that may communicate bi-directionally, via one or more antennas (not shown) via wireless links. The antennas may be capable of transmitting or receiving one or more wireless transmissions, e.g., from/to the communication module 120, the user device 18, etc. In some examples, the control circuit 100 may include a memory (not shown) including random access memory and read only memory and storing computer-readable, computer-executable firmware (e.g., firmware 112 as shown in FIG. 2) including codes or instructions which, when executed, cause the controller 110 to perform various functions described herein. For example, the instructions may include instructions on how to perform a pre-check of various breaker parameters including power quality before energizing a branch. Such breaker parameters and power quality pre-check may be referred to as 'Shake down'.

Shake-down is performed every time the remote load switching circuit breaker 1 is energized and prior to powering a branch. Shake-down is possible with some temporary power backup available in the power supply and sensing circuit (e.g., a capacitor shown in FIG. 10). Shake-down includes a breaker self-test and a power quality check, e.g., the line side voltage check, frequency check, multiple ZCD check, etc. Such pre-check of the line side parameters safeguards the connected load. A certain amount of power storage is required in the remote load switching circuit breaker for operating the secondary contact and storing some vital data pertaining to line side parameters or some fault data into the non-volatile memory of processor. Shake-down may be performed during the normal operation of the remote switching circuit breaker 1 (e.g., when there has not been a power outage). During the normal operation, the breaker electronics are periodically checked. For example, if the remote switching circuit breaker 1 operates as expected, nothing needs to be done. If the remote switching circuit breaker 1 does not operate as intended, the remote switching circuit breaker 1 is tripped. FIG. 11 illustrates the regular breaker parameter checks during the normal operation.

Shake-down is also performed immediately upon power resumption after a power outage. Generally, the power quality upon resumption of power after power outage is poor. For example, the voltage waveform may not be sinusoidal, or the frequency may not be 60 Hz, etc. Such poor power quality may damage the loads or result in unwanted hazards. By performing a Shake-down upon the resumption of power after a power outage prevents any such damages or hazards since the remote load switching circuit breaker 1 may turn on only if the power quality returns to normal. Shake-down after a power outage performs both the breaker self-test and the power quality check. First, Shake-down ensures that the secondary contact(s) 4 are open when there is a power resumption (e.g., after a power outage). Then, the breaker self-test is performed (the breaker line parameter as described with reference to FIG. 11). The breaker self-test includes a line side voltage check, frequency check, multiple ZCD checks. If the remote load switching circuit breaker 1 passes the breaker self-test, then a shake-down pass flag is set to one (1) and the Shake-down procedure ends with closing of the secondary contact 4. If the remote load switching circuit breaker 1 fails the breaker line parameter check, then the breaker self-test is performed repeatedly for a predefined period (e.g., 10 seconds). If the remote load switching circuit breaker 1 passes any of the repeated breaker self-test, then the shake-down pass flag is set to zero and the Shake-down procedure ends with closing of the secondary contact 4. If, however, the remote switching circuit breaker 1 repeatedly fails the breaker self-test for the predefined period, the shake-down flag is set to zero (0) and the Shake-down procedure ends. The user may then be notified of the failure to close the secondary contact 4 via the communication module 120. The user may then manually reset the remote switching circuit breaker 1. In short, under the Shake-down procedure the branch is energized only if the remote load switching circuit breaker 1 passes both the breaker electronics check and the power quality check such that the load 500 may be protected from a bad (e.g., unstable) mains power. As such, the Shake-downs increases the safety of the remote load switching circuit breaker 1 as well as the associated residential or office building.

Figure 12:
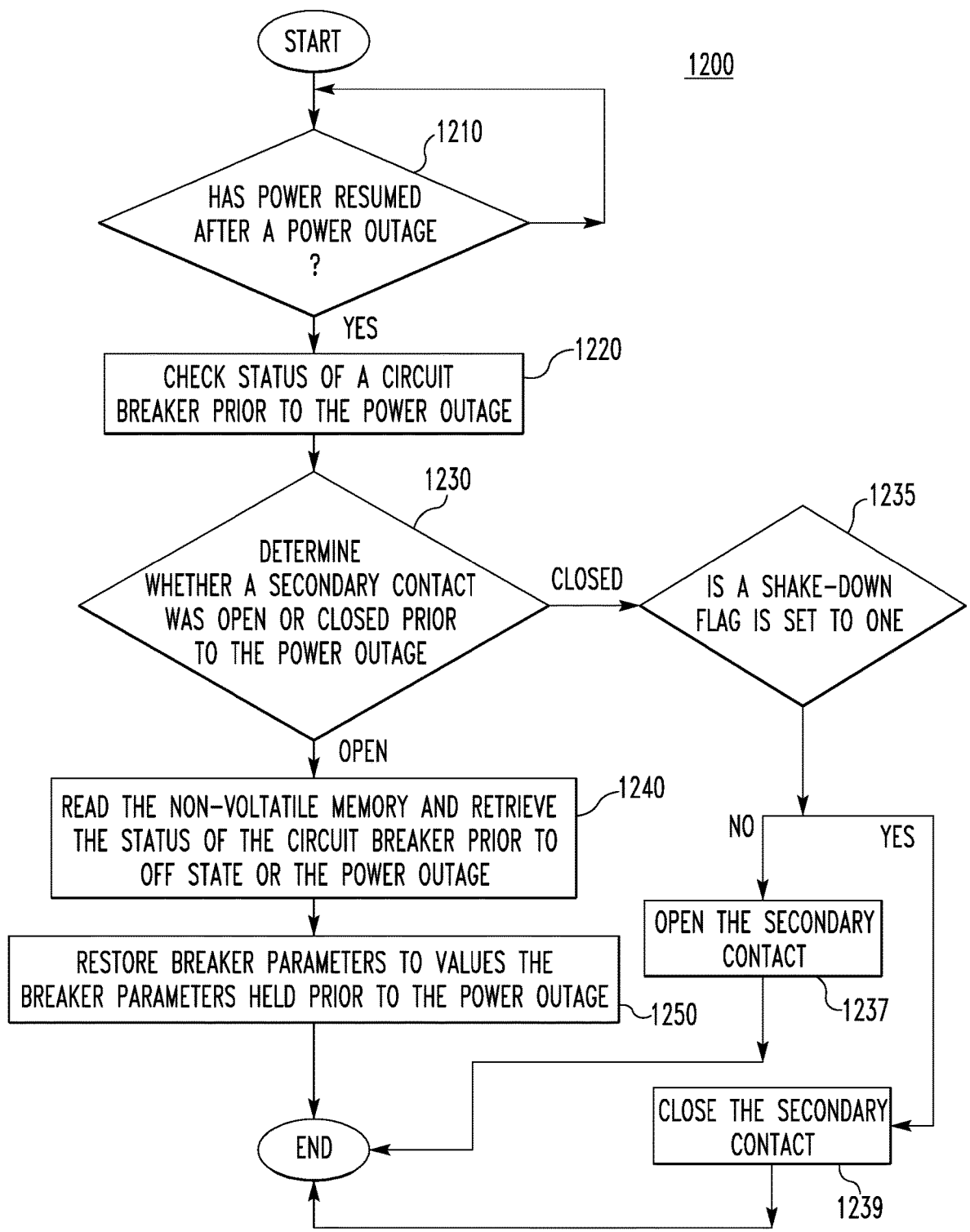
FIG. 12 is a flow chart for a method of pre-checking a remote load switching circuit breaker in accordance with an example embodiment of the disclosed concept.

In some cases, the instructions may include instructions to monitor the status of the remote load switching circuit breaker 1 based on its logs in accordance with the present disclosure. For example, the status of the remote load switching circuit breaker 1 prior to the power outage is checked from the saved log (stored in the memory). This is advantageous in that the currently existing designs of the circuit breakers do not have the capability to monitor the status of circuit breakers and its logs. In checking the status of the remote load switching circuit breaker 1, it is determined whether the secondary contact(s) 4 was open prior to the power outage. If it was, then the secondary contact 4 may remain open. If, however, the secondary contact 4 was closed prior to the power outage, it is determined whether the shake-down pass flag is set to zero. If the flag is set to zero prior to the power outage, then the secondary contact 4 may be open. If the secondary contact 4 was closed prior to the power outage and the flag is set to one, the secondary contact 4 may be closed. Subsequently, buckets and variables (e.g., registers and variable values that were present prior to the power outage) are restored to their values prior to the power outage—those values may be obtained from the memory (e.g., non-volatile memory). FIG. 12 illustrates a method for a Shake-down procedure by checking first the status of the remote load switching circuit breaker 1 (particularly, the secondary contact 4) in more detail.

Figure 13:
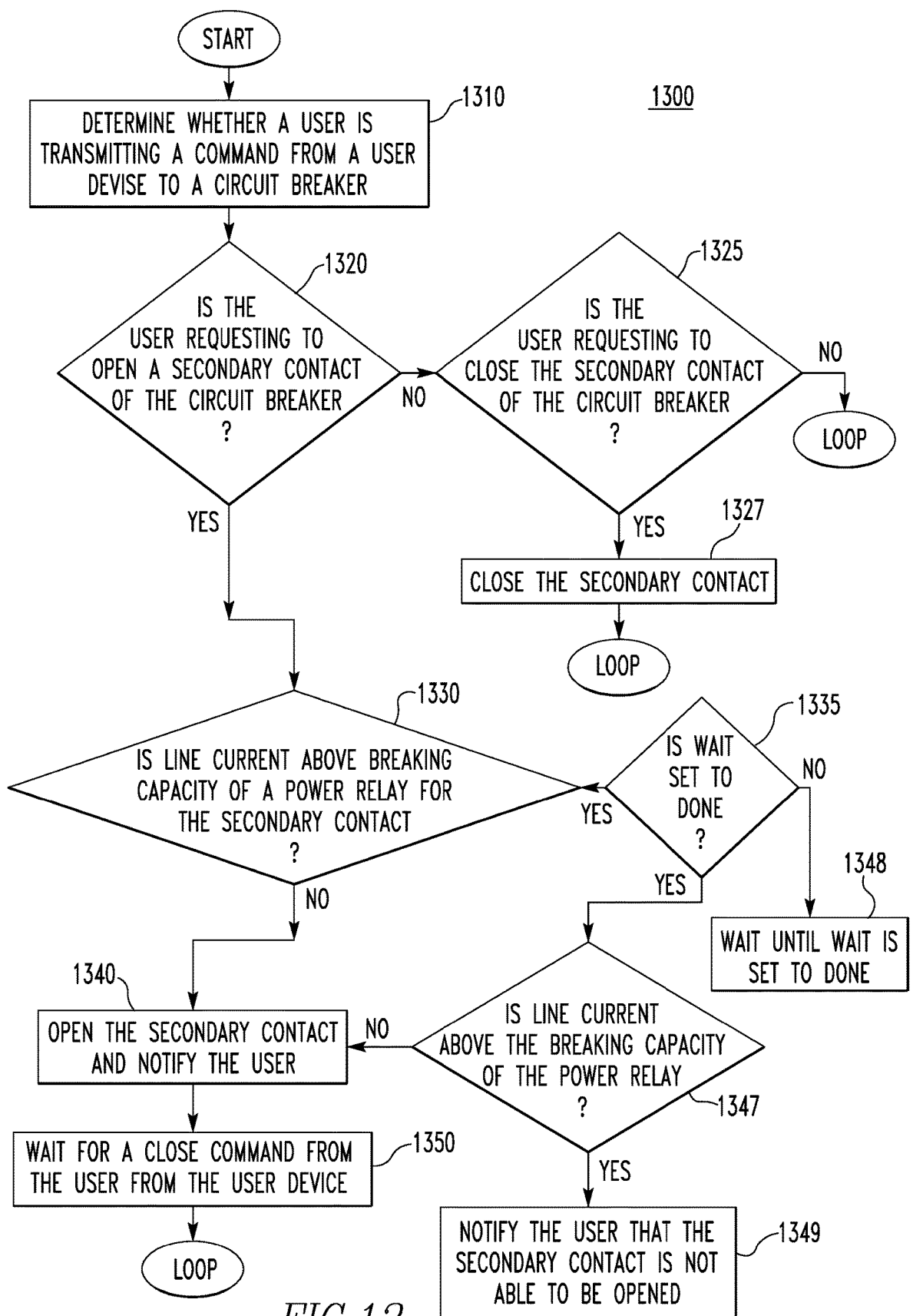
FIG. 13 is a flow chart for a method of pre-checking a remote load switching circuit breaker in accordance with an example embodiment of the disclosed concept.

In some cases, the instructions may include instructions on periodically checking any inputs from a user using, e.g., Bluetooth™ devices, for remote switching of the secondary contact 4. If there is a user request to open the secondary contact 4, then the controller 100 determines if the line current is above a breaking capacity of the secondary contact 4 (e.g., a breaking capacity of a power relay if the secondary contact 4 is a power relay). If the current is not above the breaking capacity, then the secondary contact 4 is capable of opening the load 500. If the secondary contact 4 is capable of opening the load 500, the secondary contact 4 is open via the user using the Bluetooth™ device wirelessly. The controller 100 then waits for a close command from the user. If the secondary contact 4 is not capable of opening the load 500, the controller 110 transmits a message via the communication module 120 to the user, indicating why the secondary contact 4 cannot be open. The message may be a pop up on a display screen of the user device. The user may then manually or remotely open the primary contact 2 if the secondary contact 4 is not capable of opening via communication from the Bluetooth™ device. The control circuit 100 may periodically transmit a status of the remote switching circuit breaker 1 to the user device, e.g., the edge device via Bluetooth™ low energy (BLE) wirelessly. The user may access the status of the remote switching circuit breaker 1 and read a status log as desired via the Bluetooth™ device. FIG. 13 illustrates the periodic checking of user inputs for pre-checking the line current in accordance with the present disclosure.

Figure 14:
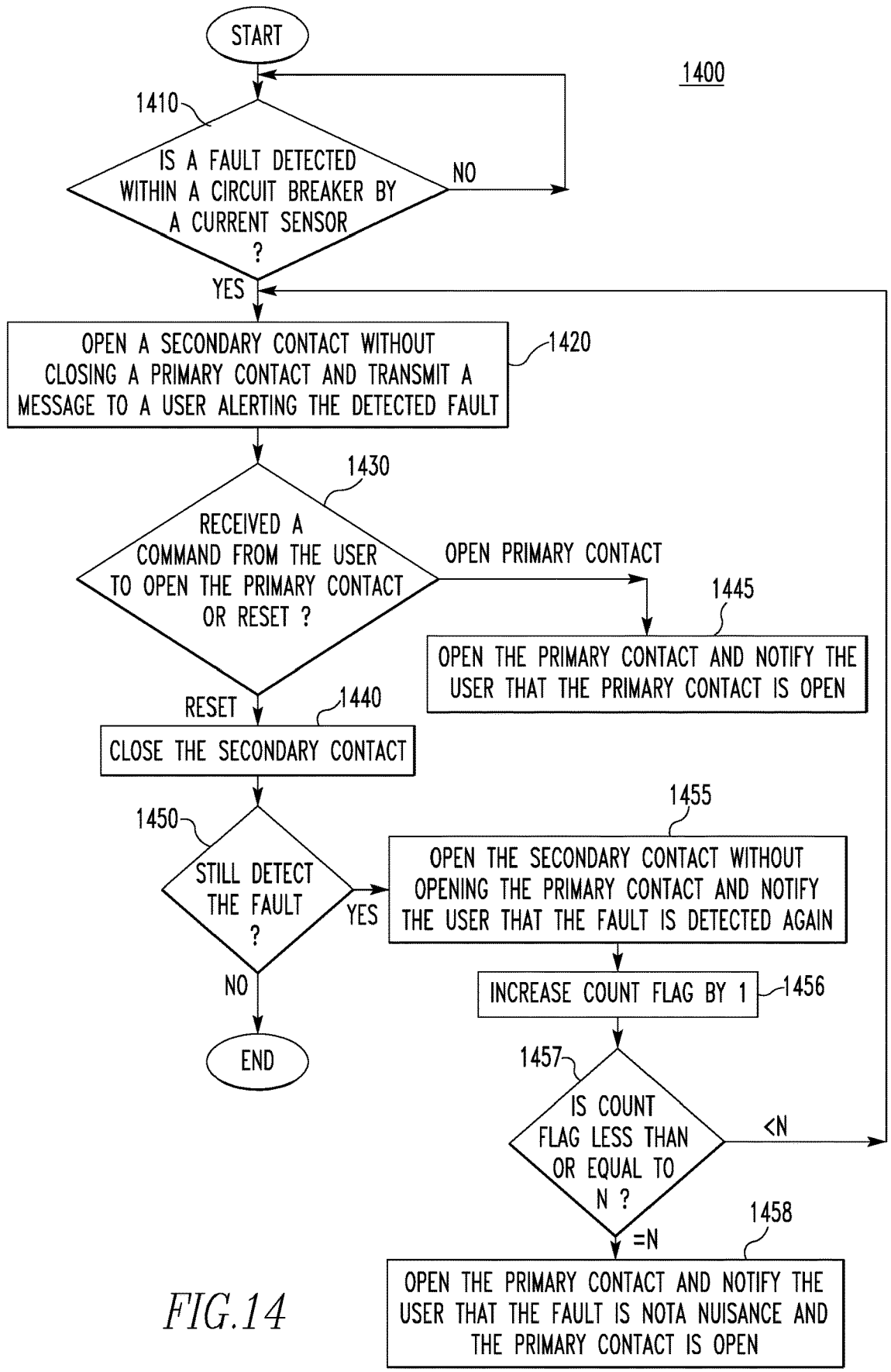
FIG. 14 is a flow chart for a method of operating a remote load switching circuit breaker in a fault condition in accordance with an example embodiment of the disclosed concept.

In some cases, the instructions may include instructions on operating the remote load switching circuit breaker 1 in less severe fault conditions that may be resolved by the remote load switching circuit breaker 1 with minimal input from the user via the user device 18 without first tripping the circuit breaker 1 and requiring the user to physically remove the fault conditions, manually reset the circuit breaker 1, and turn on the circuit breaker 1. For example, a series arc fault or less-severe ground fault may be a one-time occurring nuisance that can be resolved by the remote load switching circuit breaker 1 by opening the secondary contact 4 for a predefined period. The instructions may include an algorithm to check a fault condition to determine whether it is a nuisance or a permanent fault condition that the user needs to physically clear. FIG. 14 illustrates the operating the remote load switching circuit breaker 1 in fault conditions in accordance with the present disclosure.

In some cases, the instructions may include instructions on operating the remote load switching circuit breaker 1 in overload conditions that may be resolved by the remote load switching circuit breaker with minimal input form the user. For example, if there is a 25% overload condition (e.g., the current is 22.5 Amps, when the rated current is 18 Amps), the remote load switching circuit breaker 1 may easily resolve the overload condition by opening the secondary contact 4 and applying a cooling-off period to the circuit breaker 1. The instructions may include an algorithm to open and apply the proper cooling-off period based on the measured overload condition. FIG. 15 illustrates operating the remote load switching circuit breaker in overload conditions in accordance with the present disclosure.

The firmware (firmware 112 of FIG. 2) may include instructions for a software application to be downloaded to the user device 18 wirelessly. Upon downloading the software on the user device 18, the user may now access a grid map showing each branch (including the loads coupled to the branch) covered by each remote load switching circuit breaker 1 within his/her residence, buildings, or facility. The user may receive messages from the communication module 120, transmit commands to the remote load switching load device 1, and switch on and off the loads remotely and wirelessly. The messages may be a pop up on a screen of the user device, which the user may click and view the content of the messages. The user may transmit the commands via texts, email, or voice commands via the user device.

Figure 3:
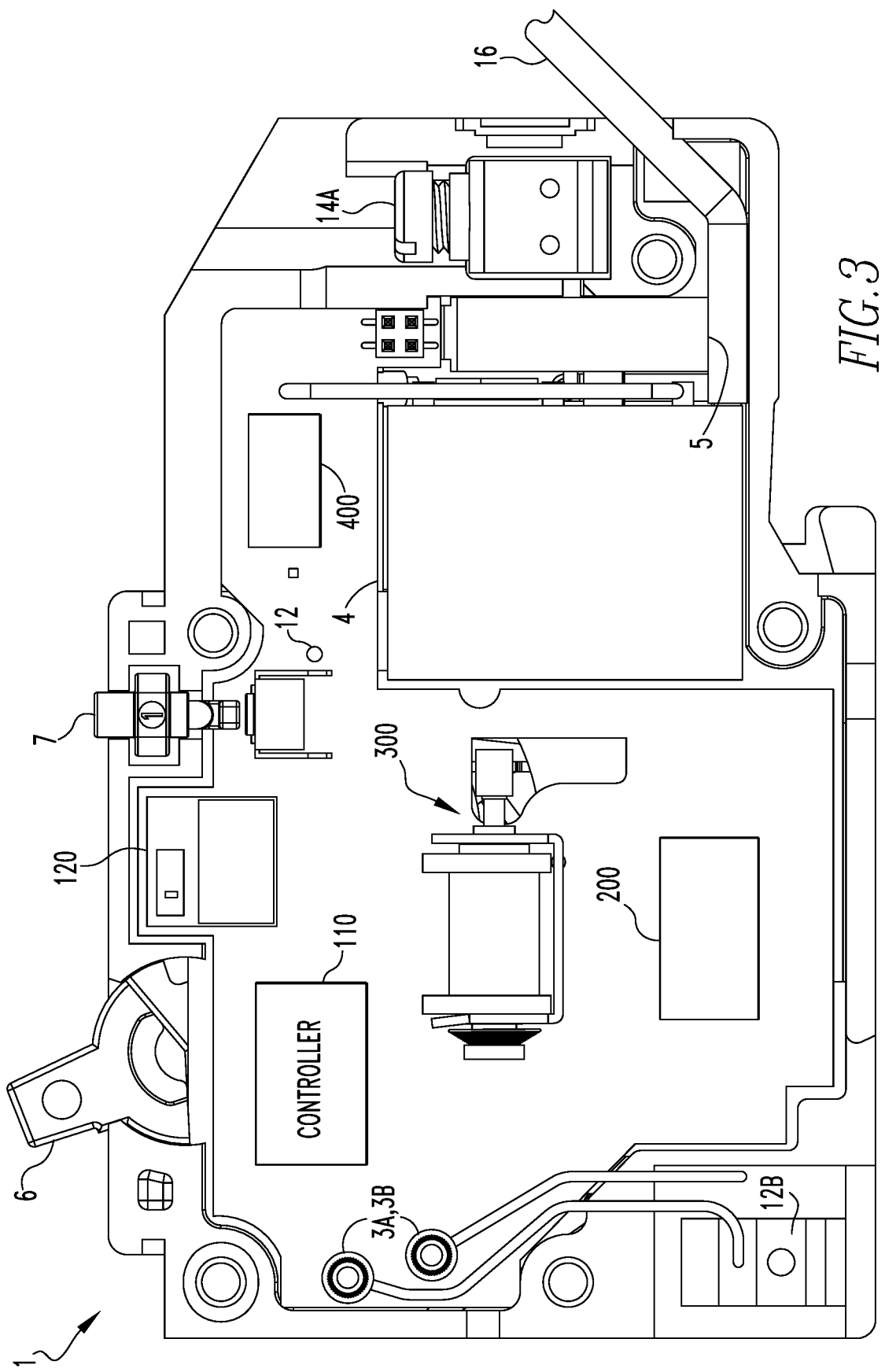
FIG. 3 is a diagram of a remote load switching circuit breaker in accordance with an example embodiment of the disclosed concept.
Figure 7:
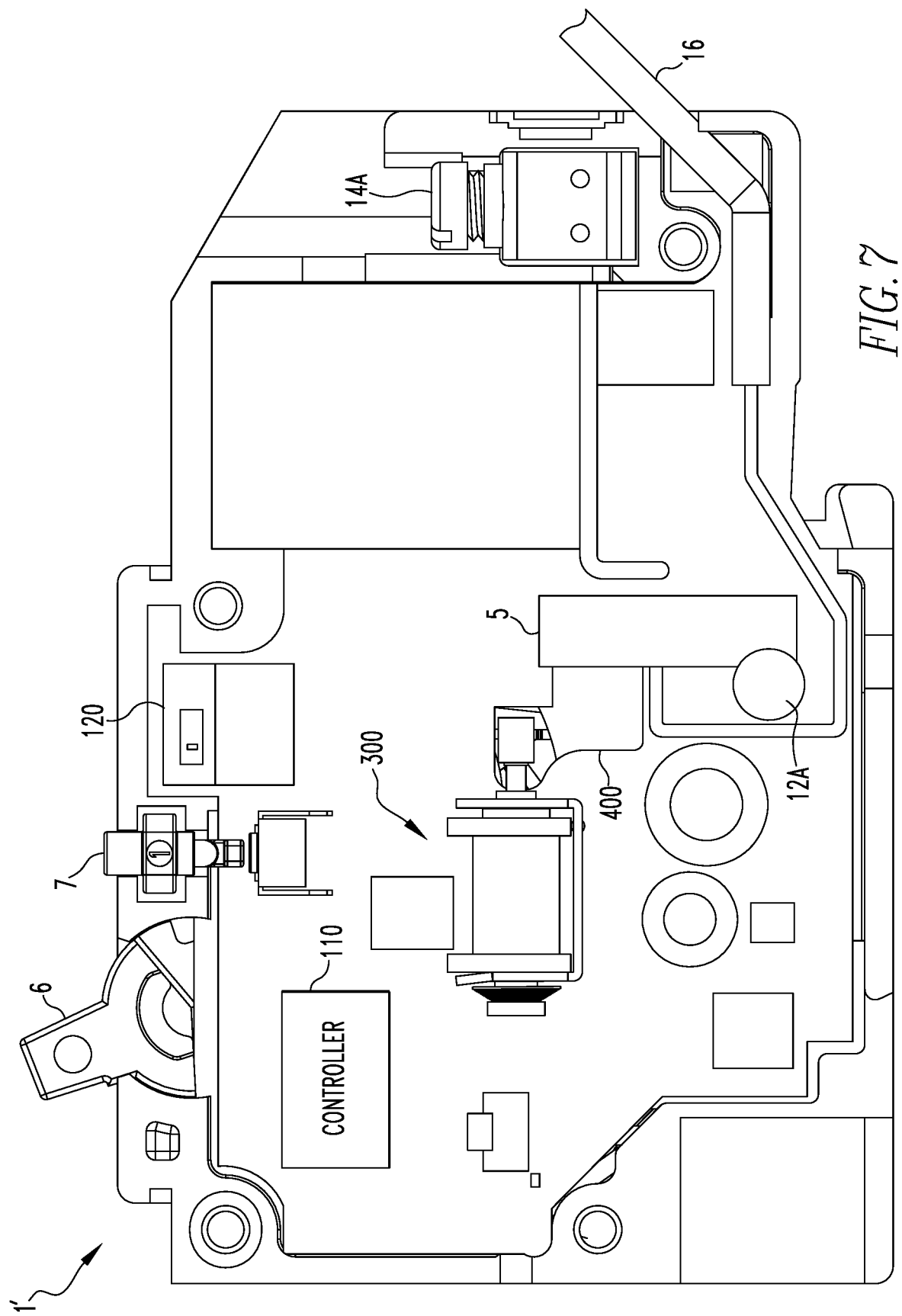
FIG. 7 is a diagram of a remote load switching circuit breaker in accordance with an example embodiment of the disclosed concept.

The remote load switching circuit breaker 1 in accordance with the present disclosure utilizes the secondary contact 4 in various ways to enhance safety features and efficiencies of the remote load switch circuit breaker 1 and increase flexibility and convenience of remote switching to the user. It is noted that there is no true indication of the status of the secondary contact 4 while the status of the primary contact 2 is indicated by a lever (e.g., a lever 6 as shown in FIGS. 3 and 7). However, the status of the secondary contact 4 is indicated by the controller 110 (via some visual indications, e.g., LED, etc.) and transmitted to the user via the communications module 120. As such, the remote load switching circuit breaker 1 satisfies the standards requirement that the status of the contacts should be visible to the user at all times. Further, while the length of the breaker 1 may be increased by including the secondary contact 4 in series with the primary contact 2, a MEMS switch may be used as a secondary contact 4 under the present disclosure, thereby reducing the length of the remote load switching circuit breaker 1 significantly. Further, the secondary contact 4 may be a power relay based design as compared to conventional servo motor based design.

FIG. 2 is a schematic diagram of a remote load switching circuit breaker system 10 in accordance with an example embodiment of the disclosed concept. The HOT conductor 12 is coupled to the remote load switching circuit breaker 1, which is coupled to the load 500, which is in turn coupled to the NEUTRAL conductor 16, thereby completing the AC loop. The remote load switching circuit breaker 1 of FIG. 2 is the same as the remote load switching circuit breaker 1 of FIG. 1, but includes more detail with respect to the electronics and the control circuit 100 of the remote load switching circuit breaker 1. The remote load switching circuit breaker 1 includes the primary contacts 2, the shunt element 3, the secondary contact 4 in series with the primary contacts 2, the current sensor 5 and the control circuit 100 as in FIG. 1. FIG. 2, however, also shows a power supply and sensing circuit 200, primary contact trip mechanism 300 and a secondary contact driving circuit 400. Further, it also shows the control circuit 100 including a controller 110 and a communication module 120.

The power supply and sensing circuit 200 is electrically coupled to the shunt element 3, the primary contact trip mechanism 300, the secondary contact 4, the secondary contact driving circuit 400, the current sensor 5, and the control circuit 100. The power supply portion of the power supply and sensing circuit 200 provides sufficient power for operation of all of the electronics within the remote load switching circuit breaker 1, especially for switching on and off of the secondary contact 4 without an external power supply. Further, any electronics voltages drawn within the remote load switching circuit breaker 1 may also be used to power the secondary contact 4, ensuring no need for any external power supply to switch on and off the secondary contact 4 as the conventional remote switching circuit breakers do. The power supply portion generally includes a bridge (not shown) which receives AC voltage from an AC power source via the HOT conductor 12, converts the AC voltage into DC voltage and outputs the DC voltage to power the control circuit 100 and the other electronics within the circuit breaker 1. The sensing circuit of the power supply and sensing circuit 200 is electrically coupled to the shunt element 3 for measuring the line current, the primary contacts 4 for detecting whether the primary contacts are open or closed, and the secondary contact 4 for detecting, e.g., whether the line current is above the breaking capacity of the secondary contact 4 or not. The sensing circuit may also include a zero current detector (ZCD, not shown) for detecting current crossing at near zero, a temperature sensing circuit (not shown) for measuring ambient temperature, etc.

The control circuit 100 includes a controller 110 and a communication module 120, which is coupled to the controller 110. Upon receiving the DC voltage from the power supply and sensing circuit 200, the control circuit 100 is activated and controls the other components of the circuit breaker 1. For example, the controller 110 receives the measured line voltage from the shunt element 3 and calculates the line current. The controller 110 may then determine whether the line current is at the rated current. In another example, the controller 110 may determine there is overload condition at the LOAD conductor 14, e.g., a vacuum cleaner is plugged in, increasing the load current beyond its capacity. In such overload condition, the controller 110 alerts the user of the overload condition and opens the secondary contact 4 based on a user command to open the secondary contact 4 over a preset cooling-off period (e.g., 15 min., 30 min., etc.). in accordance with an algorithm to cool-off the overload condition.

In another example, the controller 110 may receive a signal indicating a fault condition from the current sensor 5. Upon receipt of the fault signal, the controller 110 transmits a message to the user wirelessly indicating the detected fault via the communication module 120. Based on the user command received in response to the message, the controller 110 may open the secondary contact 4 or cause the primary contact trip mechanism 300 to open the primary contacts 2.

In another example, the controller 110 may receive a short circuit fault signal from one of the sensing components of the power supply and sensing circuit 200. Upon receiving such signal, the controller 110 causes the primary contact trip mechanism 300 to trip the remote load switching circuit breaker 1 and open the primary contacts 2. The controller 110 may transmit a message to the user of such short circuit and tripping of the circuit breaker 1. The user may later remove the short circuit condition, reset the remote load switching circuit breaker 1, and turn on the circuit breaker 1.

The communication module 120 may be any IC including its own controllers therein. However, as to activating other electronics of the remote load switching circuit breaker 1, the communication module 120 operates in conjunction with the controller 110 based on the user commands.

The primary contact trip mechanism 300 is structured to trip the primary contacts 2 open based on a signal from the controller 110 (e.g., a signal indicating a detected parallel arc fault). The primary contact trip mechanism 300 may include a solenoid (as shown in FIGS. 3 and 7), a movable arm which causes the primary contacts 2 to separate, etc. The primary contacts 2 switch on when the power quality is normal, and switch off when a fault (e.g., a short-circuit fault, a parallel arc fault, severe overcurrent) or severe overload is detected. Conventional circuit breakers may be a single contact device (i.e., thermal mag circuit breakers)

including mechanical contact equivalent to the primary contacts 2 of the remote load switching circuit breaker 1.

The secondary contact driving circuit 400 may be one as described with reference to FIG. 10.

FIG. 3 is a diagram of a remote load switching circuit breaker 1 in accordance with an example embodiment of the disclosed concept. FIG. 3 illustrates the remote load switching circuit breaker 1 as described with reference to FIGS. 1 and 2 (specifically, arranging the shunt element 3 between the HOT conductor 12 and the primary contacts 2 so as to avoid the impedance generated by the tip of the primary contacts 2 and the voltage drop in the primary contacts 2) in a printed circuit board assembly (PCBA) in accordance with the present disclosure. The PCBA shows a line tapping 12A, an input lug 12B, shunt tappings 3A,B (for shunt element), a primary contact trip mechanism 300, a lever 6 for indicating the status of the primary contact, a reset switch 7 for a user to reset the circuit breaker 1, a controller 110, a communication module 120, a current sensor 6, a power supply and sensing circuit 200 (embedded on the PCB), a secondary contact 4, a secondary contact driving circuit 400a NEUTRAL conductor 16, and output lugs 14A. This embodiment may ensure an uninterrupted power to the PCBA irrespective of the primary contacts 2 or the secondary contacts 4, and use the current sensor 5 and the sensing circuit (included in the power supply and sensing circuit 200 of FIG. 2) to determine the line current without hampering some of the existing circuit breaker designs.

FIG. 4 is a diagram of a remote load switching circuit breaker system 10 in accordance with an example embodiment of the disclosed concept. FIG. 4 illustrates a short distance communication between a remote load switching circuit breaker 1 and a user device 18A via BLE. The user device 18A may be any HMI (Human Machine Interface) devices, e.g., a cellular phone, a laptop, or any other device that can communicate in short distance. While FIG. 4 shows BLE as a short distance communication technology, other technologies such as WiFi, ZigBee, any other short distance communication technology available may be used.

FIG. 5 is a diagram of a remote load switching circuit breaker system 10 in accordance with an example embodiment of the disclosed concept. FIG. 5 illustrates a long distance communication between a remote load switching circuit breaker 1 and a user device 18, e.g., HMI device such as a cellular phone 18A, a voice control device 18B. The circuit breaker 1 is coupled to a gateway 20A via a short distance communications technologies such as BLE, ZigBee, etc. The gateway 20A is in turn coupled to the user devices 18 via access point communication A or the utility cloud 20B which is communicatively coupled to the user devices 18. The utility cloud 20B may communicate with the user device 18 via LTE, LTE-A, LTE-pro, or even WiFi. As such, the long distance communication between a remote load switching circuit breaker 1 and the user devices 18 may be achieved without Internet when using the gateway 20A and the access point communication A or with Internet when using the gateway 20A and the utility cloud 20B. In some examples, the remote load switching circuit breaker 1 may communicate with the user device 18 without the gateway 20A via the utility cloud 20B.

Figure 6:
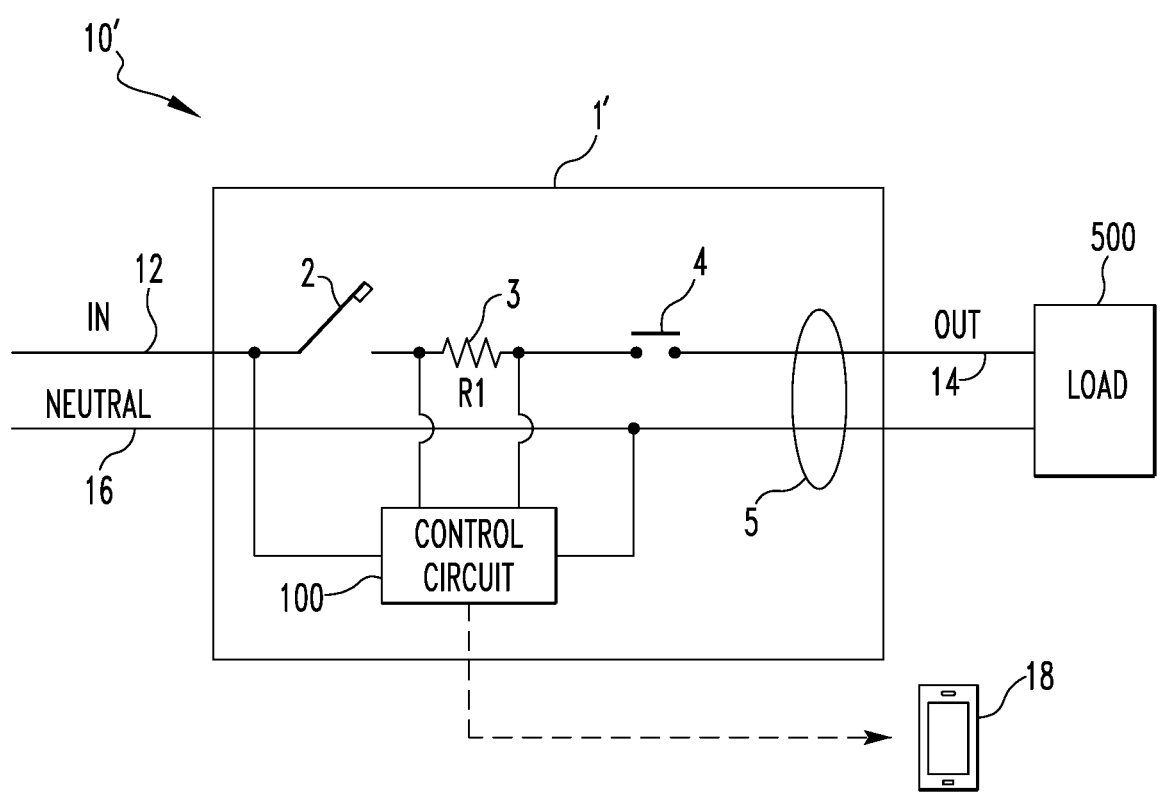
FIG. 6 is a schematic diagram of a remote load switching circuit breaker system in accordance with an example embodiment of the disclosed concept.

FIG. 6 is a schematic diagram of a remote load switching circuit breaker system 10' in accordance with an example embodiment of the disclosed concept. The remote load switching circuit breaker 1' is similar to the remote load switching circuit breaker 1 of FIGS. 1 and 2, and 5, except that the shunt element 3 is arranged between the primary contacts 2 and the secondary contact 4. This embodiment ensures uninterrupted power to the PCBA irrespective of primary contacts 2 and secondary contact 4. This embodiment may entail some changes in the existing arc fault circuit and algorithm associated with the arc fault conditions. This embodiment may encounter changes in resistance of the primary contacts 2 over a period, thereby affecting some calibrations and calculations.

FIG. 7 is a diagram of a remote load switching circuit breaker in accordance with an example embodiment of the disclosed concept. FIG. 7 shows a remote load switching circuit breaker 1' in a PCBA. The remote load switching circuit breaker 1' is similar to the remote load switching circuit breaker 1 in the PCBA as shown in FIG. 3, except that the shunt element 3 is arranged between the primary contacts 2 and the secondary contact 4.

Figure 8A:
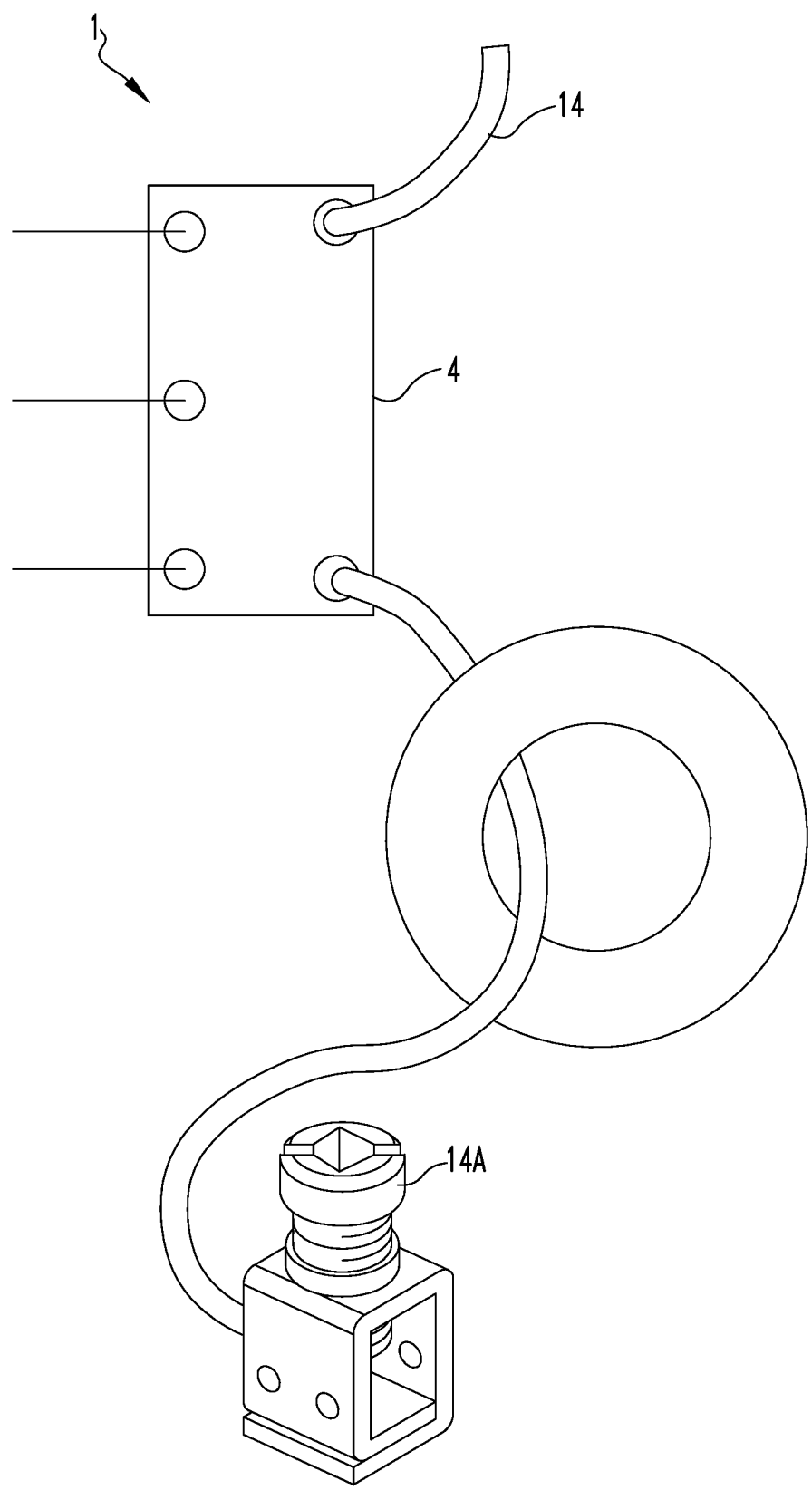
FIGS. 8A-B illustrate line and neutral connections, respectively, to a remote load switching circuit breaker in accordance with an example embodiment of the disclosed concept.
Figure 8B:
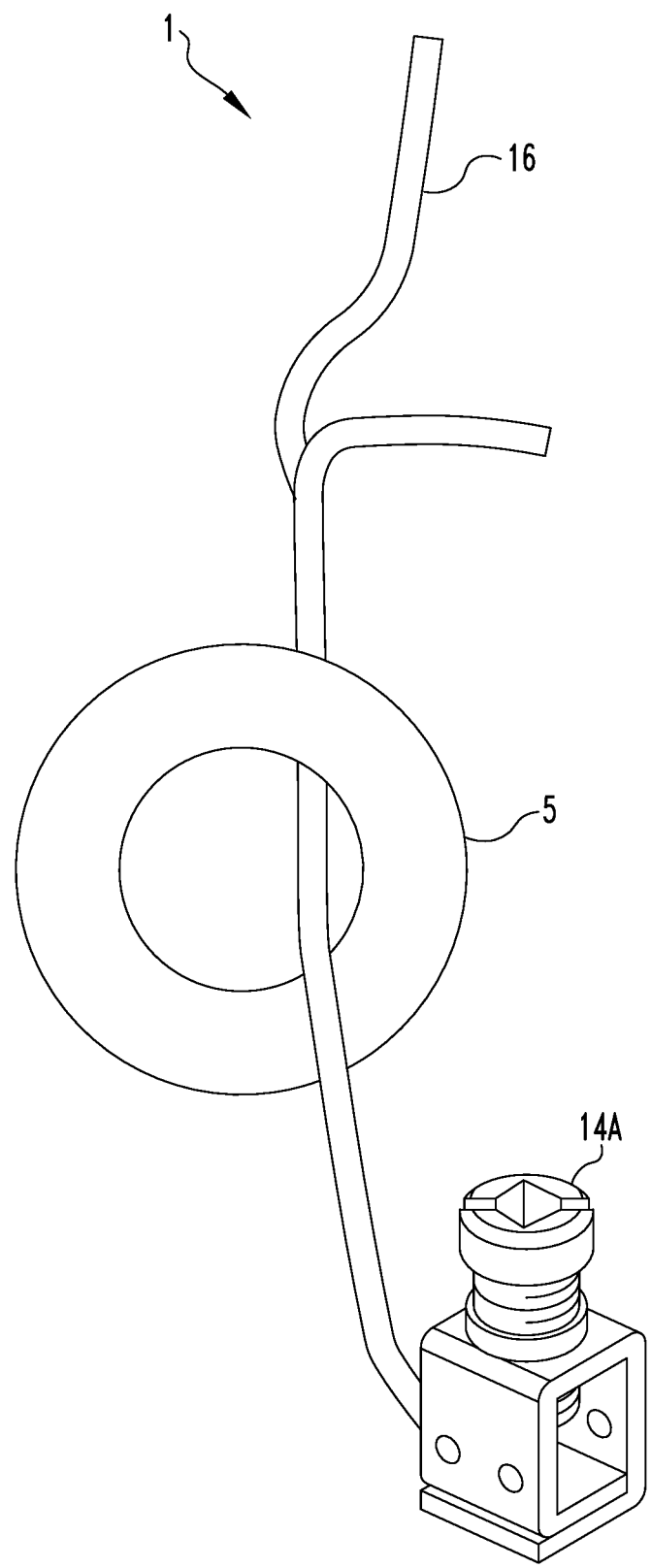
Figure 9A:
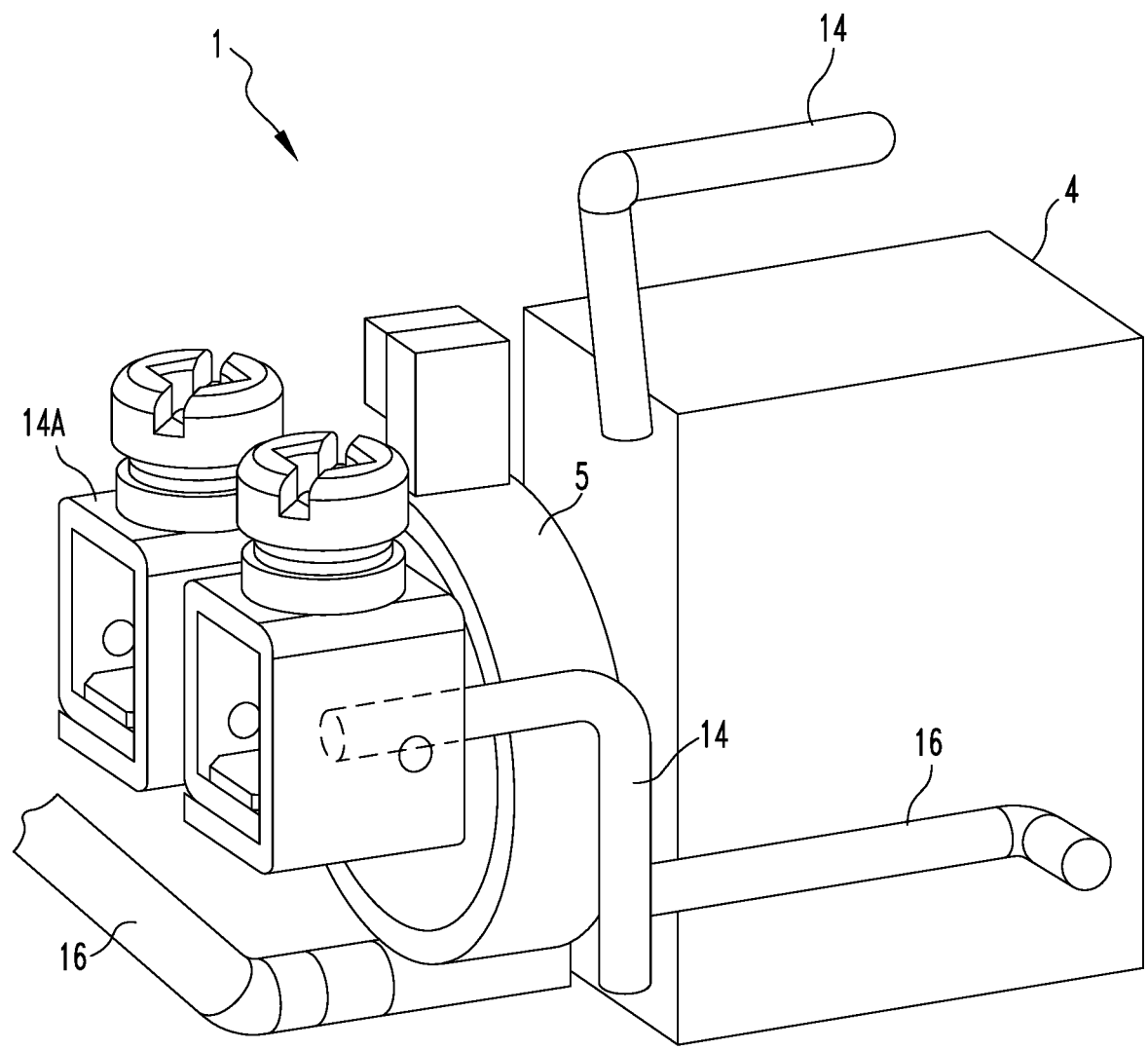
FIGS. 9A-B illustrate line and neutral connections, respectively, to a remote load switching circuit breaker in accordance with an example embodiment of the disclosed concept.
Figure 9B:
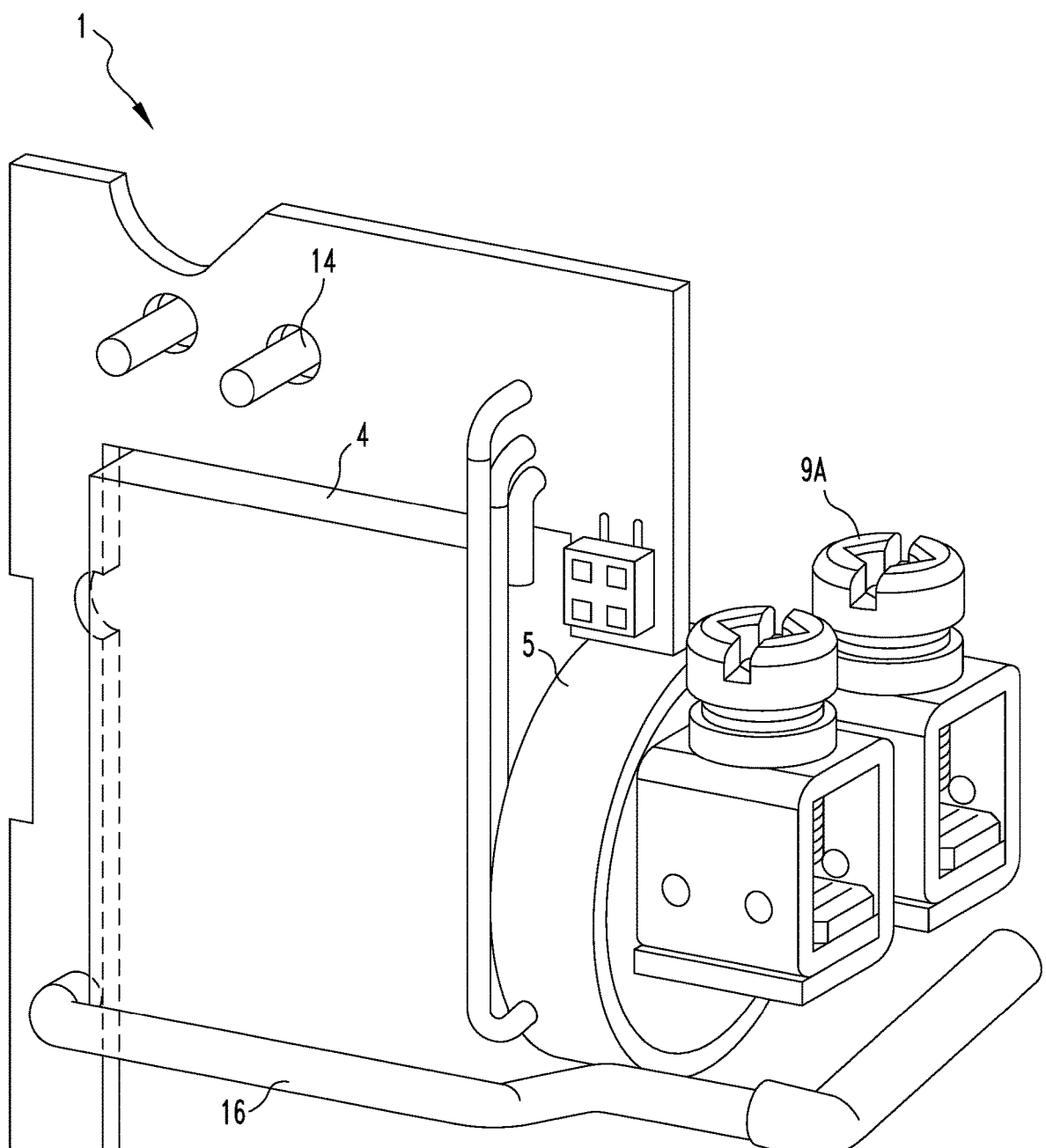

FIGS. 8A-9B illustrate line and neutral connections, respectively, to a remote load switching circuit breaker 1 in the PCBA in accordance with an example embodiment of the disclosed concept. FIG. 8A shows a secondary contact power relay 400 electrically coupled to the LOAD conductor 14, a current sensor 5, and an output lug 14A in the PCBA. FIG. 8B shows the NEUTRAL conductor 16 electrically coupled to the current sensor 5 and another output lug 14A. FIG. 9A is a perspective back view of the remote load switching circuit breaker 1 in the PCBA, which shows the LOAD conductor 14 coupled to the current sensor 5, the secondary contact power relay 4, and the output lug 14A. FIG. 9B is a perspective front view of the remote load switching circuit breaker 1, showing the NEUTRAL conductor 16 coupled to the secondary contact power relay 4, the current sensor 5, and the output lug 14A.

FIG. 10 is a schematic diagram of a secondary contact 4 in a power relay design in accordance with an example embodiment of the disclosed concept. In FIG. 10, the power relay 4 is a latching relay (bi-stable) and operates mechanically. For example, if it receives one set of pulse, the latch closes, and if it receives another set of pulse, the latch opens. The storage capacitor C1 allows the power relay to latch or delatch even during a power outage. In some example, a relay coil L12 (as shown in FIG. 10) may consume 100 mA at 12V DC (1200 mW). It may require a pulse of more than 3 ms in order to change the state of relay. Thus, the relay coil 12 consumes 36 mJ in energy in this example. A storage capacitor C1 may be placed at output of the relay driving circuit 400, which could supply mJ of energy at, e.g., 12 V to 9.6 V in 40 ms. The power relay 4 is electrically coupled to the controller 110 and operates in accordance with the GPIO inputs (e.g., P2 and P6). The GPIO pins control the current flowing to the switches Q1 and Q2. GPIO P2 is electrically coupled to the secondary set Q2 and closes the secondary contact 4 when it is at HI. P6 is electrically coupled to the secondary reset switch Q1 and opens the secondary contact 4 when it is at HI. The controller 110 also includes pins for the communications between two devices. For example, UART (Universal asynchronous reception and transmission) RXD (receive), UART TXD (transmit), RTS (request to send) N, CTS (clear to send) N allow for the two pin communications. The controller 110 also includes pins for clock input and output (XTALO, XTALI), pins for Bluetooth™ low energy (BLE) operations (SPI (serial peripheral interface) CLK BLE, SPI CS (chip select) BLE, SPI MOSI (master out slave in) BLE, SPI MISO (master in slave out) BLE), and status indicator pins for the secondary contact 4 (P16, P4, and P7). While FIG. 10 shows a latching type power relay 400, the power relay 400 may be non-latching (mono-stable) as well. In such case, the storage capacitor C1 would not be included.

Figure 11A:
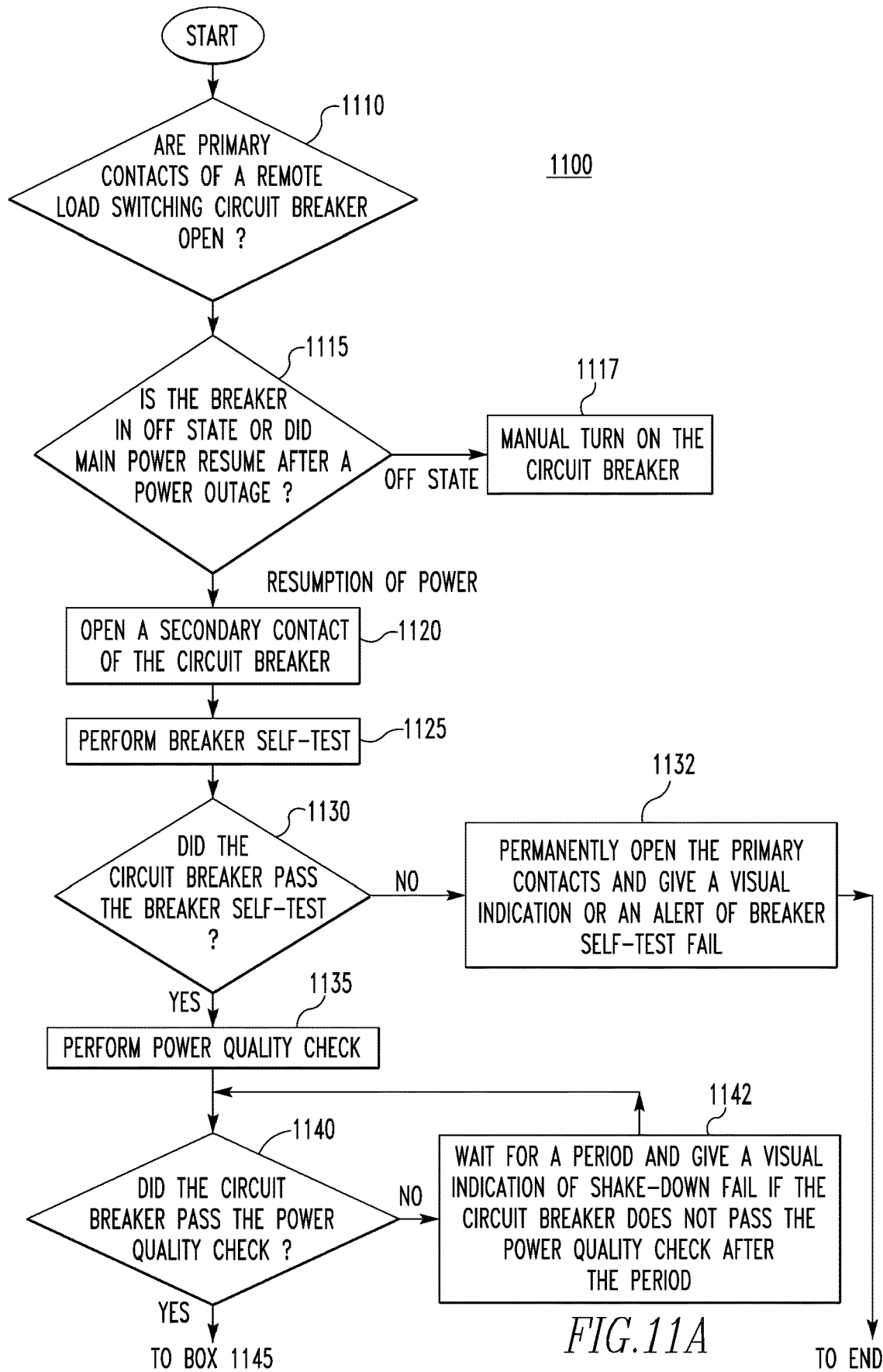
FIG. 11A-B illustrate a flow chart for a method of pre-checking a remote load switching circuit breaker in accordance with an example embodiment of the disclosed concept.
Figure 11B:
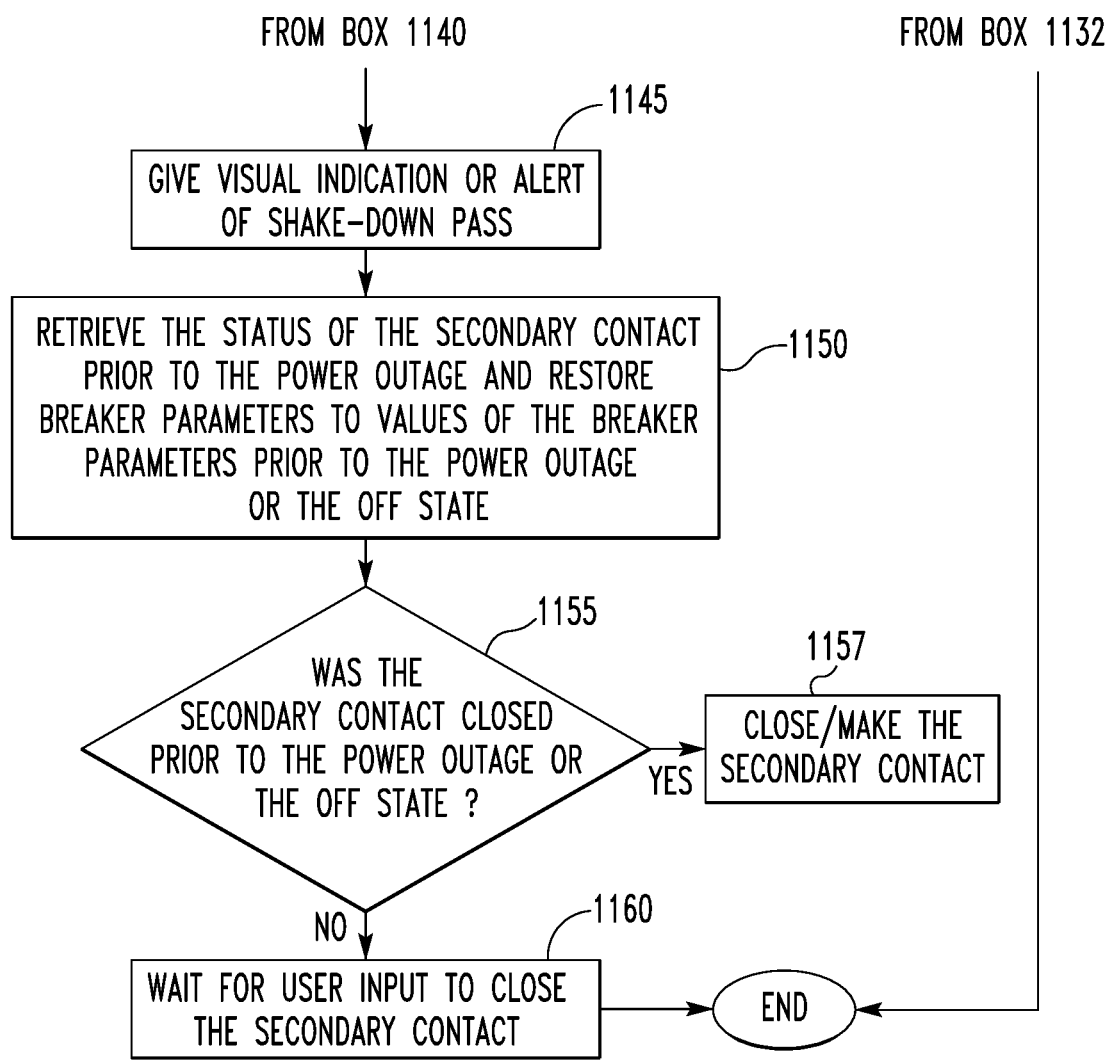

FIGS. 11A-B illustrate a flow chart for a method 1100 of pre-checking a remote switching circuit breaker in accordance with an example embodiment of the disclosed concept. The method 1100 may be performed by the remote load switching circuit breaker 1, 1' as described with reference to FIGS. 1-7 and the components thereof. The method 1100 is a pre-checking of power quality during the normal operation. The pre-checking is also referred to as Shake-down. Under the method 1100, if primary contacts of a remote load switching circuit breaker is open and there is mains power being supplied, a secondary contact of the circuit breaker is open by default.

At 1110, a controller of the circuit breaker determines whether the primary contacts are open.

At 1115, the controller determines whether the breaker is in OFF (TRIP) state. If the breaker is in the OFF state, at 1117 the user manually turns on the circuit breaker. If the power has resumed and main power is being supplied, the method 1100 proceeds to 1120.

At 1120, the controller opens a secondary contact of the circuit breaker. The user may open the secondary contact using a remote switching via wireless communications or manually.

At 1125, the controller performs a breaker self-test. The breaker self-test checks for breaker line parameters, including a line side voltage check, frequency check, multiple ZCD checks, etc.

At 1130, the controller determines whether the circuit breaker has passed the breaker self-test. If no, at 1132, the controller permanently opens the primary contacts and gives a visual indication or an alert of breaker self-test fail. The alert may be sent to the user by the controller to the user device. If yes, the method 1100 proceeds to 1135.

At 1135, the controller performs a power quality check.

At 1140, the controller determines whether the circuit breaker has passed the power quality check (e.g., determining whether voltage signal is sinusoidal, whether the frequency is 60 Hz, etc.). If no, at 1142 the controller waits for a period, e.g., 5 minutes, gives a visual indication of shake-down fail if the circuit breaker does not pass the power quality check after the period. If yes, the method proceeds to 1140.

At 1145, the controller gives a visual indication or an alert of shake-down pass. The alert may be transmitted to the user device.

At 1150, the controller retrieves the status of the secondary contact prior to the power outage and restore breaker parameters to value of the breaker parameters prior to the power outage of the OFF state.

At 1155, the controller determines whether the secondary contact was closed prior to the power outage or the OFF state. If yes, at 1157 the controller closes or makes the secondary contact. If no, the method proceeds to 1160.

At 1160, the controller waits for a user input to close the secondary contact. Then, the method 1100 ends.

FIG. 12 is a flow chart for a method 1200 of power outage checking of a remote switching circuit breaker in accordance with an example embodiment of the disclosed concept. The method 1200 may be performed by the remote load switching circuit breaker 1, 1' as described with reference to FIGS. 1-7 and the components thereof. The method 1200 is a pre-checking of power quality after a power outage and also checks the status of the secondary contact prior to the power outage based on a log stored in a memory of the controller. The pre-checking is also referred to as Shake-down.

At 1210, the controller of the circuit breaker determines whether power is restored after a power outage.

At 1220, the controller checks status of a circuit breaker prior to the power outage.

At 1230, the user determines whether a secondary contact was open or closed prior to the power outage. If the secondary contact was closed, at 1235 the user determines whether a shake-down flag is set to 'one', meaning the power quality has returned to normal. If the shake-down flag is not set to one, at 1237 the user opens the secondary contact using remote switching via wireless communications, e.g., BlueTooth™ low energy (BLE), LTE, LTE-A, etc., and the method 1200 ends. If the shake-down flag is set to one, at 1239 the user closes the secondary contact and the method 1200 ends. If the secondary contact was open prior to the power outage, then the method 1200 proceeds to 1240.

At 1240, the controller reads the non-volatile memory and retrieves the status of the circuit breaker prior to OFF state or the power outage.

At 1250, the controller restores breaker parameters to values at which the breaker parameters held prior to the power outage and the method 1200 ends.

FIG. 13 is a flow chart for a method 1300 of remote switching of a secondary contact of a remote load switching circuit breaker based on a user command in accordance with an example embodiment of the disclosed concept. The method 1300 may be performed by the remote switching circuit breaker 1, 1' as described with reference to FIGS. 1-7, or components (e.g., controller 110, communication module 120, etc.) thereof.

At 1310, the controller determines whether the user is transmitting a command from a user device (e.g., edge device) to a circuit breaker.

At 1320, the controller determines whether the user is requesting to open a secondary contact of the circuit breaker. If the user is not requesting to open the secondary contact of the circuit breaker, at 1325 it is determined whether the user is requesting to close the secondary contact, the controller closes the secondary contact. If the user is not requesting to close the secondary contact, the controller loops. If the controller determines that the user is requesting to open a secondary contact at 1320, the method 1300 continues to 1330.

At 1330, the controller determines whether line current is above the breaking capacity of a power relay for the secondary contact. If yes, at 1335 the controller determines whether wait flag is set to Done. If the wait flag is set to Done, at 1347 the controller determines whether the line current is above the breaking capacity of the power relay. If at 1347 the line current is determined to be above the breaking capacity of the power relay, at 1349 the controller notifies the user that the secondary contact is not able to be opened. If at 1335 it is determined that the wait flag is not set to 'Done', at 1348 the controller waits until the wait flag is set to 'Done'. If at 1330 and 1347 the line current is determined not be above the breaking capacity of the power relay, the method 1300 proceeds to 1340.

At 1340, the controller opens the secondary contact and notifies the user.

At 1350, the controller waits for a 'Close' command from the user from the user device and loops.

FIG. 14 is a flow chart of a method 1400 for operating a remote load switching circuit breaker in a fault based on severity of the fault condition in accordance with an example embodiment of the disclosed concept. Conventionally, when a fault is detected in a circuit breaker, the breaker is automatically tripped and the user is required to return to the circuit breaker, clear the fault, and reset the circuit breaker. However, there are several types of fault, e.g., a short circuit, overcurrent, nuisance (one-time occurring fault such as low intensity series arc fault or ground fault), a permanent fault (e.g., a permanent ground fault, a parallel series fault), etc. When the short circuit and overcurrent are detected, the primary contacts are open and the circuit breaker is tripped. The arc fault and ground fault are detected by electrical device such as a current sensor on the load side. The arc fault may be a series fault and a parallel fault. A series arc fault may have low intensity and not so dangerous. A parallel arc fault is serious and dangerous in nature as a fire hazard or damage to the load, and thus the remote load switching circuit must be tripped in the parallel arc fault scenarios. A series arc fault and fault conditions that are less severe (e.g., one-time event (nuisance)) may be resolved by simply opening the secondary contact for a predefined period (e.g., 15 min., 30 min., etc.) without having to automatically trip the primary contacts. In such examples, requiring the user to return to the circuit breaker after an automatic tripping may be waste of time. Thus, the method 1400 affords the user the flexibility to make the contacts (e.g., power up the particular branch with the detected fault) through his/her edge user device. The method 1400 may be performed by the remote load switch circuit breaker 1, 1' as described with reference to FIGS. 1-7 and any components thereof.

At 1410, a controller of the remote load switch circuit breaker determines whether there is a fault detected within the remote load switching circuit breaker. If no fault is detected, the method 1400 returns to 1410. If a fault is detected, the method 1400 proceeds to 1420.

At 1420, the controller opens a secondary contact without closing a primary contact, and transmits a message a message to a user device alerting a user of the detected fault. The message may include the voltage or current value of the fault, which branch within the facility, building or residence is experiencing the fault, which load within the branch is causing the detected default, etc. The message may be transmitted wirelessly to a short distance gateway edge devices (e.g., a cellular phone, a tablet, a laptop, etc.) via Bluetooth™ technologies, or to a long distance user device (e.g., a cellular phone, a tablet, a laptop, etc.) via, e.g., LTE, LTE-A technologies. The message may pop up to a screen of the user device.

At 1430, the communication module or the controller determines whether the remote load switching circuit breaker has received a command from the user device to open the primary contact or reset the remote load switching circuit breaker. The user may transmit a command to open a primary contact or reset based on the severity of the detected default. For example, the detected default may be a nuisance (e.g., one-time occurring a series arc fault or low-intensity ground fault, etc.) or a permanent fault (e.g., a permanent ground fault, a parallel arc fault, etc.). If the detected fault is the permanent fault, the user may transmit to a communication module of the circuit breaker a command to open the primary contact. If the user thinks that the detected fault may be a nuisance or the remote load switching circuit breaker may be reset, the user may transmit to the communication module a command to reset the remote load switching circuit breaker. If at 1430 the controller has received a reset command from the user, the method proceeds to 1440. If the controller has received a command to open the primary contact, at 1445 the controller opens the primary contact and notifies the user that the primary contact is now open. The user may then return to the place where the remote load switching circuit breaker is, remove the fault, and reset the circuit breaker. In cases of a parallel arc fault, the remote load switching circuit breaker may be automatically tripped and open the primary contact without having to wait for a user command. In such case, the remote load switching circuit breaker notifies the user that it had detected a parallel arc fault and tripped the circuit breaker due to the dangers associated with the parallel arc fault (e.g., a fire hazard, a damage to the load or the circuit breaker, etc.). The user subsequently returns to the place where the remote load switching circuit breaker, clears the default, and resets the remote load switching circuit breaker.

At 1440, the controller closes the secondary contact.

At 1450, the controller determines whether it still detects the fault. If it does, then at 1455 the controller opens the secondary contact again without opening the primary contact and notifies the user that the fault is detected again. At 1456, the controller increases Count flag by one (1). At 1457, the controller determines whether the Count flag is less than or equal to N (which can be any chosen number). If the Count flag is less than three, the method 1400 returns to 1420 and repeats the subsequent steps. If the Count flag is equal to three (3) at 1458 the controller opens the primary contact and notifies the user that the fault is not a nuisance and the primary contact is now open. The controller may determine that the default is a permanent ground default or a non-nuisance series arc that the user is required to clear before turning on the remote load switching circuit breaker. If at 1450 no default is detected, the method 1400 ends and the remote load switching circuit breaker operates normally.

The method 1400 is advantageous in that conventional circuit breakers trips automatically upon detecting any default condition, thereby requiring the user to later return to the circuit breaker to clear the default, and then reset the circuit breaker. By allowing the user to clear the less severe default (e.g., nuisance) by opening the secondary contact while keeping the primary contact closed, the remote load switching circuit breaker enables the user to resolve nuisances remotely and wirelessly by simply opening and closing the secondary contact and provides flexibility in resolving such nuisances without having to manually clear the fault and turn on the remote load switching circuit breaker.

Figure 15A:
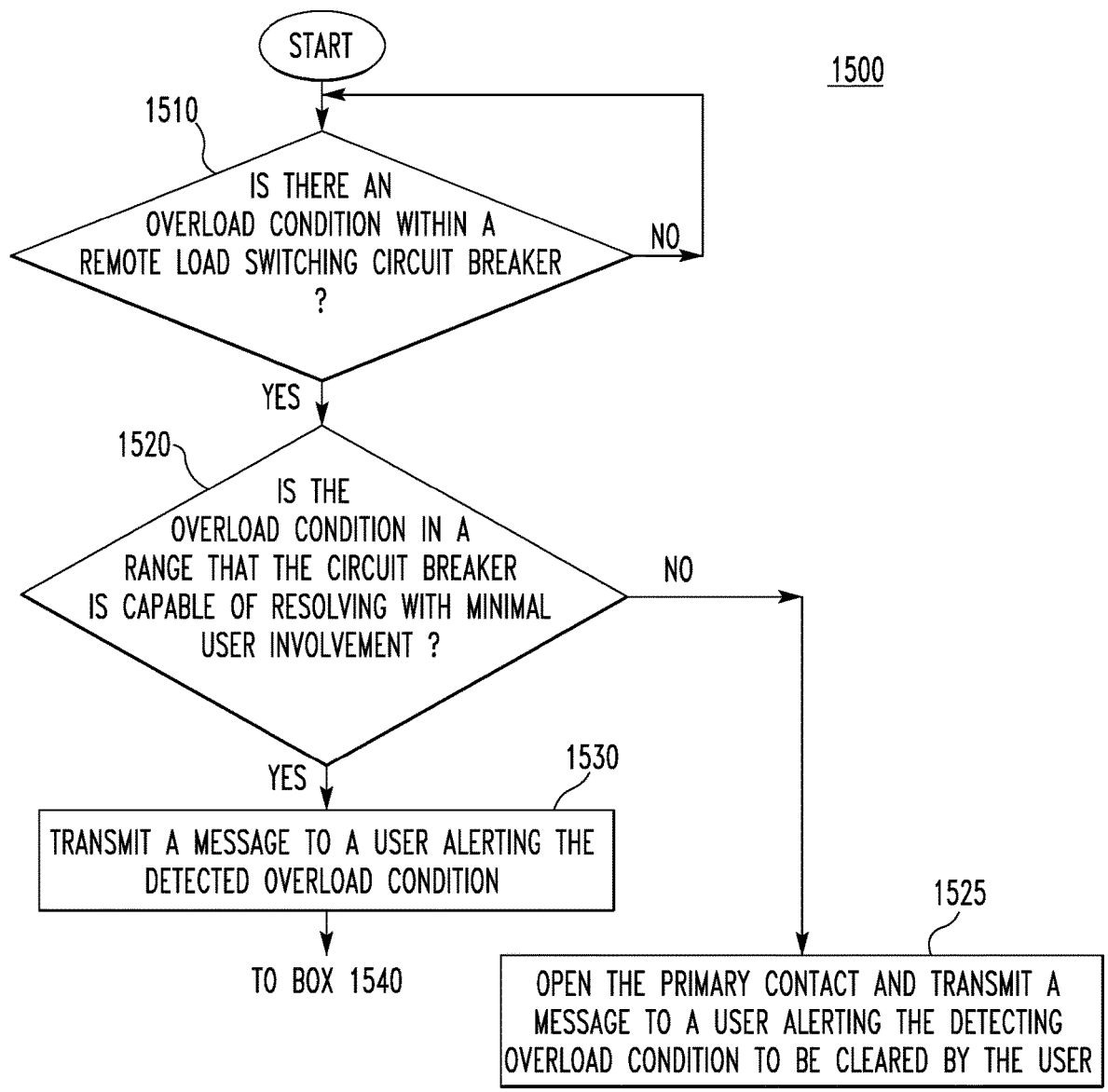
FIGS. 15A-B illustrate a flow chart for a method of operating a remote load switching circuit breaker in an overload condition in accordance with an example embodiment of the disclosed concept.
Figure 15B:
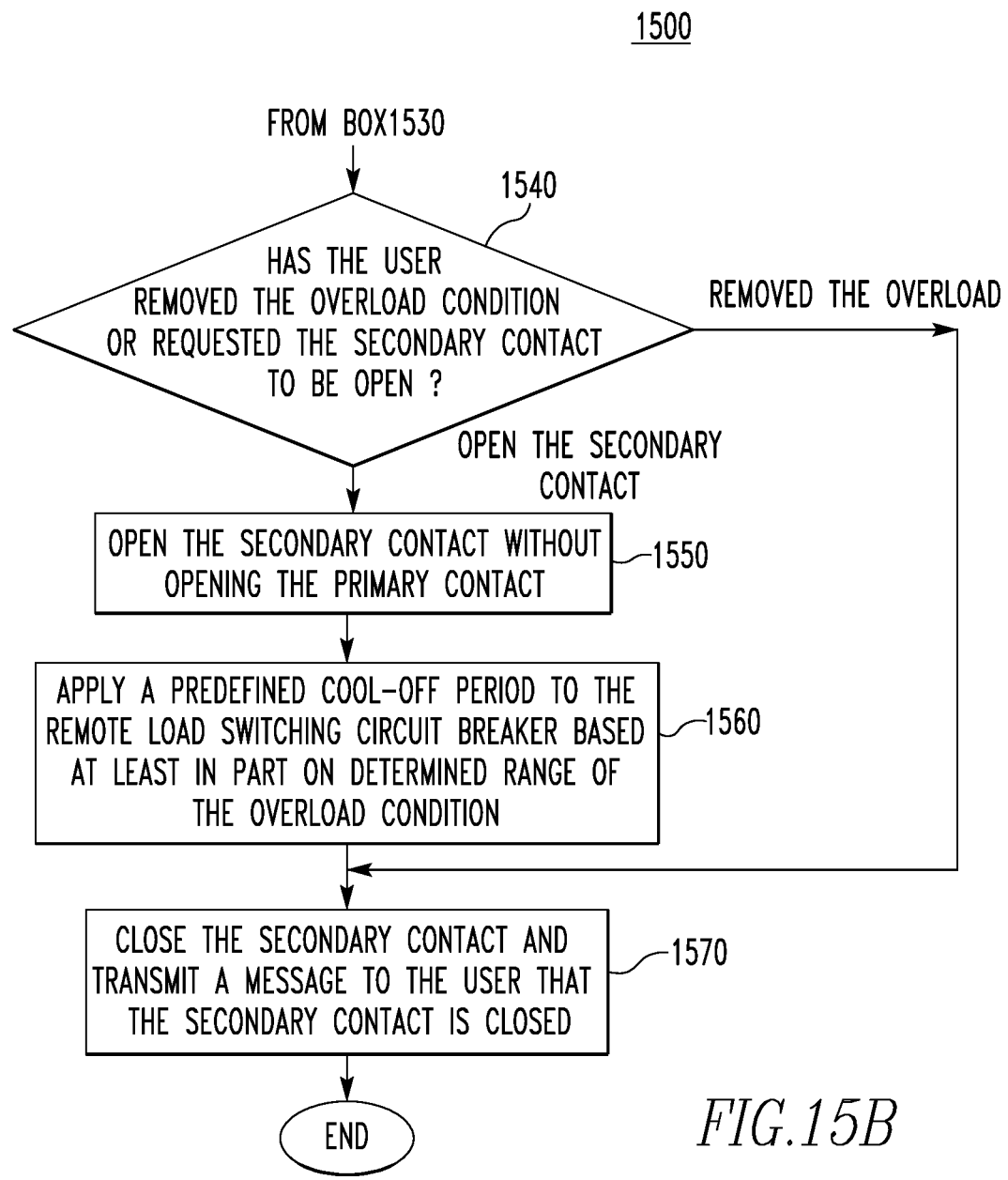

FIGS. 15A-B illustrate a flow chart for a method 1500 of operating a remote load switching circuit breaker in an overload condition in accordance with an example embodiment of the disclosed concept. The method 1500 allows the remote load switching circuit breaker to resolve the overload condition by opening a secondary contact without automatically tripping the circuit breaker. For example, if there is a 25% overload or overcurrent in a particular circuit within the remote load switching circuit breaker, conventional circuit breakers' bimetal strip may typically heat up-deflect-trip the breaker within, 10 minutes, 20 minutes, etc. Then, the breaker should be let to cool off and only then the user would be able to reclose the breaker. The present disclosure allows the secondary contact in series with primary contacts to operate the secondary contacts in case of such overload/overcurrent scenario (if the secondary contacts are able to open at the said current) with some predefined time which is computed electronically inside a controller by sensing the line current. And similar to thermal magnetic breaker, a cool-off time may be determined and only after so much of time would the user be able to reclose the secondary contacts from his/her cell phone (or any edge devices). In case the overload is so much so that that the secondary contacts cannot be open, the microcontroller may decide to open the primary contacts. The method 1500 may be performed by the remote switching circuit breaker 1, 1' as described with reference to FIGS. 1-7, or components (e.g., controller 110, communication module 120, etc.) thereof.

At 1510, the controller determines whether there is an overload condition within the remote load switching circuit breaker. If no, the method 1500 repeats 1510. If yes, the method 1500 proceeds to 1520.

At 1520, the controller determines whether the detected overload condition is within a range that the circuit breaker is capable of resolving by opening the secondary contact of the circuit breaker without having to open the primary contact. For example, the overload condition may be a short circuit condition that may require tripping the circuit breaker. Or the overload condition may be less severe, such that by simply opening the secondary contact over a cooling-off period may clear the overload condition. If no, at 1525 the controller opens the primary contact and transmits a message to the user alerting the detected fault condition requires to be cleared by the user. The user may later physically remove the overload condition, reset the remote load switching circuit breaker, and turn on the breaker. If yes, the method proceeds to 1530.

At 1530, the controller transmits a message to a user alerting the detected overload condition.

At 1540, the controller determines whether the user has removed the overload condition (e.g., by switching off a load that is creating the overload condition) or requested the secondary contact to be open. If the user has removed the overload condition, there is no need to trip the remote load switching circuit breaker, and thus the method 1500 ends. If the user requested to open the secondary contact, the method 1500 continues to 1540.

At 1550, the controller opens the secondary contact without opening the primary contact.

At 1560, the controller applies a cool-off period to the remote load switching circuit breaker. The cool-off period may be predefined based on the determined rage of the overload condition. For example, the cool-off period may be 15 minutes for 10% overload, 20 minutes for 20% overload, 30 minutes for 25% overload, etc.).

At 1570, the controller closes the secondary contact upon the lapse of the cool-off period (or the user has removed the overload condition) and transmits a message to the user that the secondary contact is closed. Then, the method 1500 ends.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A remote load switching circuit breaker comprising:
   a primary contact coupled to a primary contact trip mechanism and structured to trip the remote load switching circuit breaker upon detecting a fault condition by a sensor;
   a secondary contact in series with the primary contact and coupled to a secondary contact driving circuit, wherein the secondary contact is structured to be switched on and off remotely by a user using a user device communicatively coupled to the remote load switching circuit breaker via wireless communication;
   a shunt element coupled to the primary contact and structured to measure a line voltage;
   a control circuit comprising a controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker self-test based at least in part on the user command; and
   a power supply and sensing circuit structured to supply power to the control circuit, the secondary contact, the secondary contact driving circuit, and the primary contact trip mechanism, and to sense voltages at a plurality of points in the remote load switching circuit breaker and transmit the sensed voltage to the controller for measuring respective current based on the sensed voltages, wherein the secondary contact is fully powered by the power supply and sensing circuit, without having to receive power from an external power supply.

2. The remote load switching circuit breaker of claim 1, wherein the firmware includes a software application downloadable to the user device wirelessly such that the user is able to monitor and control the circuit breaker remotely and wirelessly using the user device based at least in part on the message received from the communication module.

3. The remote load switching circuit breaker of claim 1, wherein the wireless communication comprises short range wireless communication or long range wireless communication.

4. The remote load switching circuit breaker of claim 1, wherein the remote load switching circuit breaker is communicatively coupled to the user device via a gateway.

5. The remote load switching circuit breaker of claim 4, wherein the gateway is communicatively coupled to a utility cloud.

6. The remote load switching circuit breaker of claim 4, wherein the remote load switching circuit breaker is communicatively coupled to the user device via a utility cloud.

7. The remote load switching circuit breaker of claim 1, wherein the firmware is further configured to instruct the controller to determine a severity of the fault condition.

8. The remote load switching circuit breaker of claim 7, wherein the controller is structured to attempt to clear the fault condition by opening and closing the secondary contact without tripping the primary contact.

9. The remote load switching circuit breaker of claim 8, wherein the controller is further structured to:
   determine the fault condition as a permanent fault condition to be cleared physically by the user after a plurality of attempts to clear the fault condition by opening and closing the secondary contact; and
   upon such determination, open the primary contact and notify the user that the fault is the permanent fault condition.

10. The remote load switching circuit breaker of claim 1, wherein the firmware is further configured to instruct the controller to determine a level of an overload condition upon detection of the overload condition.

11. The remote load switching circuit breaker of claim 10, wherein the controller is structured to determine whether the overload condition is within a range that the circuit breaker is capable of resolving by opening the secondary contact for a cooling-off period.

12. The remote load switching circuit breaker of claim 11, wherein the controller is further structured to:

open the secondary contact without opening the primary contact based at least in part on the determination that the overload condition is within the range;
apply the cool-off period to the remote load switching circuit breaker based at least in part on the determined range of the overload condition;
determine whether the overload condition has been removed; and
close the secondary contact upon the lapse of the cool-off period based upon a determination that the overload condition has been removed.

13. The remote load switching circuit breaker of claim 1, wherein the controller further comprises a log comprising circuit breaker data and structured to present the circuit breaker data based at least in part on a user command and to allow the user to monitor a status of the circuit breaker based on the log wirelessly and remotely.

14. The remote load switching circuit breaker of claim 1, wherein the pre-check is performed upon resumption of power after a power outage.

15. The remote load switching circuit breaker of claim 1, wherein the shunt element is arranged between a hot conductor coupled to an AC power source and the primary contact and is further structured to measure the line voltage and impedance within the shunt element only.

16. The remote load switching circuit breaker of claim 1, wherein the secondary contact comprises a micro-electromechanical system device.

17. The remote load switching circuit breaker of claim 1, wherein the controller is further structured to schedule switching on and off of a load based on a user command via the user device.

18. The remote load switching circuit breaker of claim 1, wherein the pre-check is performed every time the remote load switching circuit breaker is energized and prior to powering a branch associated with the remote load switching circuit breaker.

19. The remote load switching circuit breaker of claim 18, wherein the branch is energized only upon passing both the power quality check and the breaker line parameters check.

20. A remote load switching circuit breaker system comprising:
    a load;
    a hot conductor electrically coupled to a power source;
    a load conductor electrically coupled to the load;
    a user device;
    a remote load switching circuit breaker electrically coupled to the hot conductor and the load conductor, the remote load switching circuit breaker comprising:
        a primary contact coupled to a primary contact trip mechanism and structured to trip the circuit breaker upon detecting a fault condition by a sensor;
        a secondary contact in series with the primary contact and coupled to a secondary contact driving circuit, wherein the secondary contact is switched on and off remotely by a user using a user device communicatively coupled to the remote load switching circuit breaker via wireless communication;
        a shunt element coupled to the primary contact and structured to measure a shunt voltage drop;
        a control circuit comprising a controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker line parameters test based at least in part on the user command; and
        a power supply and sensing circuit structured to supply power to the control circuit, the secondary contact, the secondary contact driving circuit, and the primary contact trip mechanism, and to sense voltages at a plurality of points in the circuit breaker and transmit the sensed voltage to the controller for determining respective current based on the sensed voltages, wherein the secondary contact is fully powered by the power supply and sensing circuit, without having to receive power from an external power supply.

21. A method for operating a remote load switching circuit breaker after a pre-checking power quality of a circuit breaker, comprising:
    performing, by a controller of the remote load switching circuit breaker, a breaker self-test for a predefined period, the breaker self-test comprising testing a circuit including breaker electronics and operations of the breaker electronics, the remote load switching circuit breaker comprising: (i) a primary contact coupled to a primary contact trip mechanism and structured to trip the remote load switching circuit breaker upon detecting a fault condition by a sensor; (ii) a secondary contact in series with the primary contact and coupled to a secondary contact driving circuit, wherein the secondary contact is structured to be switched on and off remotely by a user using a user device communicatively coupled to the remote load switching circuit breaker via wireless communication; (iii) a shunt element coupled to the primary contact and structured to measure a line voltage; (iv) a control circuit comprising the controller and a communication module communicatively coupled to the user device for receiving a user command and transmitting a message associated with the remote load switching circuit breaker to the user device, the controller including a firmware configured to instruct the control circuit to perform a pre-check for at least one of power quality test and the breaker self-test based at least in part on the user command; and (v) a power supply and sensing circuit structured to supply power to the control circuit, the secondary contact, the secondary contact driving circuit, and the primary contact trip mechanism, and to sense voltages at a plurality of points in the remote load switching circuit breaker and transmit the sensed voltage to the controller for measuring respective current based on the sensed voltages, wherein the secondary contact is fully powered by the power supply and sensing circuit, without having to receive power from an external power supply;
    determining whether the remote load switching circuit breaker has passed the breaker self-test;
    performing the power quality test including testing for voltage signal, frequency and zero cross detection;
    determining whether the remote load switching circuit breaker has passed the power quality check; and
    turning on the remote load switching circuit breaker only after passing the breaker self-test and the power quality test.

22. A method for operating a remote load switching circuit breaker, comprising:
    opening, by the controller of the remote load switching circuit breaker, a secondary contact without closing a primary contact and alerting a user of the detected fault, the remote load switching circuit breaker comprising (i)

the primary contact coupled to a primary contact trip mechanism and structured to trip the remote load switching circuit breaker upon detecting a fault condition by a sensor; (ii) the secondary contact in series with the primary contact and coupled to a secondary contact driving circuit, wherein the secondary contact is structured to be switched on and off remotely by a user using a user device communicatively coupled to the remote load switching circuit breaker via wireless communication; (iii) a shunt element coupled to the primary contact and structured to measure a line voltage; (iv) a control circuit comprising the controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker self-test based at least in part on the user command; and (v) a power supply and sensing circuit structured to supply power to the control circuit, the secondary contact, the secondary contact driving circuit, and the primary contact trip mechanism, and to sense voltages at a plurality of points in the remote load switching circuit breaker and transmit the sensed voltage to the controller for measuring respective current based on the sensed voltages, wherein the secondary contact is fully powered by the power supply and sensing circuit, without having to receive power from an external power supply;

attempting to clear the fault by opening and closing the secondary contact based on the user command to reset;

determining whether the fault is still present in the remote load switching circuit breaker; and operating the remote load switching circuit breaker if the fault is not present; or repeating the attempt to clear the fault by opening and closing the secondary contact for a predefined number of times, determining that the fault is a permanent fault upon detecting the fault after the attempt to clear the fault for the predefined number of times, and opening the primary contact and notifying the user of the permanent default.

23. A method for checking a status of a remote load switching circuit breaker, comprising:

determining by a controller of the remote load switching circuit breaker, upon a detection of an overload condition, whether the overload condition is within a range that the remote load switching circuit breaker is capable of resolving by opening a secondary contact, the remote load switching circuit breaker comprising (i) a primary contact coupled to a primary contact trip mechanism and structured to trip the remote load switching circuit breaker upon detecting a fault condition by a sensor; (ii) the secondary contact in series with the primary contact and coupled to a secondary contact driving circuit, wherein the secondary contact is structured to be switched on and off remotely by a user using a user device communicatively coupled to the remote load switching circuit breaker via wireless communication; (iii) a shunt element coupled to the primary contact and structured to measure a line voltage; (iv) a control circuit comprising the controller and a communication module communicatively coupled to the user device for receiving a user command and transmitting a message associated with the remote load switching circuit breaker to the user device, the controller including a firmware configured to instruct the control circuit to perform a pre-check for at least one of power quality test and breaker self-test based at least in part on the user command; and (v) a power supply and sensing circuit structured to supply power to the control circuit, the secondary contact, the secondary contact driving circuit, and the primary contact trip mechanism, and to sense voltages at a plurality of points in the remote load switching circuit breaker and transmit the sensed voltage to the controller for measuring respective current based on the sensed voltages, wherein the secondary contact is fully powered by the power supply and sensing circuit, without having to receive power from an external power supply;

transmitting the message to the user alerting the detected overload condition;

determining whether the overload condition has been removed by the user or a user command to open the secondary contact has been received; and closing the secondary contact based on a determination that the overload condition has been removed, or opening the secondary contact based on the received user command, applying a predefined cool-off period based at least in part on the determined range, and closing the secondary contact upon a lapse of the predefined cool-off period.

* * * * *